(12) United States Patent
Nair et al.

(10) Patent No.: US 6,963,425 B1
(45) Date of Patent: Nov. 8, 2005

(54) SYSTEM AND METHOD FOR LOCATING COLOR AND PATTERN MATCH REGIONS IN A TARGET IMAGE

(75) Inventors: Dinesh Nair, Austin, TX (US); Siming Lin, Austin, TX (US); Darren Schmidt, Cedar Park, TX (US); Nicolas Vazqúez, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1028 days.

(21) Appl. No.: 09/638,271

(22) Filed: Aug. 14, 2000

(51) Int. Cl.⁷ .............................. G06F 15/00; G06K 1/00
(52) U.S. Cl. .................. 358/1.9; 358/2.1; 358/520; 382/165; 382/170; 382/181; 382/190; 382/195; 382/224
(58) Field of Search .................. 358/1.9, 2.1, 520; 382/165, 170, 181, 190, 195, 224

(56) References Cited

U.S. PATENT DOCUMENTS

| | | | |
|---|---|---|---|
| 5,085,325 A | | 2/1992 | Jones et al. |
| 5,383,036 A | * | 1/1995 | Mailloux et al. ........... 358/518 |
| 5,410,637 A | | 4/1995 | Kern et al. |
| 5,652,881 A | | 7/1997 | Takahashi et al. |
| 5,751,450 A | | 5/1998 | Robinson |
| 5,799,105 A | | 8/1998 | Tao |
| 5,802,361 A | * | 9/1998 | Wang et al. ................ 382/217 |
| 5,828,777 A | | 10/1998 | Suzuki |
| 5,832,115 A | * | 11/1998 | Rosenberg .................. 382/199 |
| 5,892,837 A | * | 4/1999 | Luo et al. ................... 382/117 |
| 6,031,568 A | * | 2/2000 | Wakitani .................... 348/169 |
| 6,094,509 A | * | 7/2000 | Zheng et al. ............... 382/218 |
| 6,115,494 A | * | 9/2000 | Sonoda et al. ............. 382/165 |
| 6,122,391 A | * | 9/2000 | Ringland et al. ........... 382/100 |
| 6,229,921 B1 | * | 5/2001 | Wenzel et al. ............. 382/209 |
| 6,272,239 B1 | | 8/2001 | Colla et al. |
| 6,272,245 B1 | * | 8/2001 | Lin ............................ 382/195 |
| 6,282,317 B1 | | 8/2001 | Luo et al. |
| 6,292,575 B1 | | 9/2001 | Bortolussi et al. |
| 6,370,270 B1 | | 4/2002 | Nair et al. |
| 6,463,176 B1 | * | 10/2002 | Matsugu et al. ........... 382/195 |
| 6,597,736 B1 | * | 7/2003 | Fadel ..................... 375/240.01 |
| 6,625,308 B1 | | 9/2003 | Acharya et al. |
| 6,658,168 B1 | * | 12/2003 | Kim .......................... 382/305 |

(Continued)

FOREIGN PATENT DOCUMENTS

EP          0 657 839          6/1995

(Continued)

OTHER PUBLICATIONS

International Search Report, Application No. PCT/US 00/22554, mailed Jul. 18, 2001.

(Continued)

*Primary Examiner*—Kimberly Williams
*Assistant Examiner*—Michael Burleson
(74) *Attorney, Agent, or Firm*—Meyertons Hood Kivlin Kowert & Goetzel, P.C.; Jeffrey C. Hood; Jason L. Burgess

(57) ABSTRACT

A system and method for locating regions in a target image that match a template image with respect to color and pattern information. The method may comprise performing a first-pass search using color information obtained in a color characterization analysis of the template image in order to find a plurality of color match candidate locations. For each color match candidate location, a region proximal to the location may then be searched in detail, based on pattern information obtained in a pattern analysis of the template image.

51 Claims, 26 Drawing Sheets

U.S. PATENT DOCUMENTS

| | | | |
|---|---|---|---|
| 6,757,428 B1 | 6/2004 | Lin et al. | |
| 2002/0037770 A1* | 3/2002 | Paul et al. | 463/36 |

FOREIGN PATENT DOCUMENTS

| | | |
|---|---|---|
| EP | 0 751 475 | 1/1997 |
| JP | 408166381 | 6/1996 |
| WO | WO 99/20056 | 4/1999 |
| WO | 99/23600 | 5/1999 |

OTHER PUBLICATIONS

K. Chen et al., "Similarity-Based Retrieved of Images Using Color Histograms", Proceedings of the SPIE, Jan. 26, 1999, XP000983710 chapters 2, 3.

J.R. Smith et al., "Tools and Techniques for Color Image Retrieval", San Jose, Feb. 1-2, 1996, Bellingham, SPIE, US, vol. 2670, Feb. 1, 1996, pp. 426-437, XPOOO642585, ISBN: 0-8194-2044-1 (whole document).

Terry Caelli and David Reye "On the Classification of Image Regions by Colour Texture and Shape," Pattern Recognition, vol. 26, No. 4, pp 461-470, 1993.

Michael J. Swain and Dana H. Ballard "Color Indexing," International Journal of Computer Vision, 7:1, pp. 11-32, 1991.

Marie-Pierre Dubuisson and Anil K. Jain "Fusing Color and Edge Information for Object Matching," IEEE, pp. 982-986, 1994.

Datacube, Inc. "Intelligent and Optimal Normalized Correlation for High-Speed Pattern Matching", Feb. 2000, 13 pages.

IMAQ™ "IMAQ Vision Concepts Manual" Oct. 2000, pp. 14-18 through 14-25.

Vertan et al. "Embedding fuzzy logic in content based image retrieval" 19th International Conference of the North American Fuzzy Information Processing Society 2000, pp. 85-89, Jul., 2000.

Han et al., "Fuzzy color histogram: an efficient color feature for image indexing and retrieval," Proc. 2000 ICASSP IEEE, vol. 4, pp. 2011-2014, Jun., 2000.

* cited by examiner

PRIOR ART PATTERN MATCHING

PRIOR ART PATTERN MATCHING WITH
CHARACTERIZATION OF THE TEMPLATE IMAGE 9 x 9 Pixel Step Size 5 x 5 Pixel Step Size

SYSTEM AND METHOD FOR LOCATING COLOR AND PATTERN MATCH REGIONS IN A TARGET IMAGE

FIELD OF THE INVENTION

The present invention relates to a system and method for locating regions of a target image that match a template image with respect to color and pattern information, wherein the invention includes efficient methods for characterizing the template image, improved methods for performing the color and pattern matching, and improved methods for locating rotated and/or scaled matches.

DESCRIPTION OF THE RELATED ART

In many applications it is necessary or desired to find one or more matches of a template image in a larger target image. Such applications include machine vision applications including process monitoring, feedback control, and laboratory automation; image and video compression; and jitter compensation in video cameras, among others. Various characteristics may be used in classifying a location in the target image as a match, including color and/or pattern information.

Prior art pattern recognition systems have typically used a template matching technique wherein the stored image or pattern to be located is iteratively compared with various portions of a target image in which it is desired to locate the template. FIG. 1 illustrates the pattern matching problem as known in the prior art. As shown, the pattern matching problem involves a template image, wherein one or more instances of the template image are desired to be located in the target image. The template image and the target image are provided to a pattern matching algorithm which performs the pattern matching. The pattern matching algorithm generally operates to compare the pixels, e.g., the grayscale value associated with the pixels, in the template image, or a selected subset of sample pixels, against each of the possible various locations in the target image.

Typically, the pattern matching algorithm involves comparing the template image, or a subset of sample pixels representing the template image, against locations in the target image on a horizontal pixel column basis and horizontal scan line basis. In other words, the sample pixels representing the template image are compared against a portion of the pixels in the target image, such as by using a 2D correlation, the sample pixels representing the template are then moved down or across a one pixel scan line or one pixel column in the target image, and the pattern matching algorithm is repeated, etc. Thus, the pattern matching algorithm generally involves comparing the template image pixels against all possible locations in the target image in an iterative fashion. The pattern matching may produce the location of the match in the image, the quality of match and possibly the orientation, size and/or scaling of the match.

The template is typically compared with portions of the target image by utilizing a correlation based pattern matching, i.e., using normalized two dimensional correlation (normalized 2D correlation). This 2D correlation is performed by placing the template over the respective portion of the image and performing a complete normalized 2D correlation between the pixels in the template and the pixels in the corresponding portion of the image, using values associated with the pixels, such as grayscale values. This correlation generally produces a correlation value which indicates the degree of correlation or match. For example, the correlation value may range between −1 and +1, wherein +1 indicates a complete match, 0 indicates no match, i.e., that the two images are uncorrelated, and −1 indicates that the two images are anti-correlated, i.e., a complete reversal of a match.

The normalized 2D correlation operation is based on a point-wise multiplication wherein the template is first conceptually placed over a portion of the image, the value associated with each point or pixel of the template is multiplied with the corresponding pixel value in the respective portion of the target image, and the result is summed over the entire template. Also, as noted above, the template image is generally compared with each possible portion of the target image in an iterative fashion. This approach is thus very computationally intensive.

Various optimizations or algorithms have been developed to provide a more efficient pattern matching technique. One prior art technique is to use selected samples or pixels from the template image, referred to as sample pixels, to represent the template image and hence to reduce the number of computations in the correlation.

FIG. 2 illustrates the pattern matching process of the prior art which involves characterization of the template with a reduced number of sample pixels. In this process, a characterization of the template is performed to extract features from the template image. In other words, the template is characterized to represent the template image with a lesser number of points or pixels, referred to as sample pixels, which presumably accurately characterize the template image. The template image is characterized in this fashion because the time required for the pattern matching is generally directly proportional to the number of points or pixels representing the template image which are used in the pattern matching. Thus the template is characterized to reduce the number of samples or pixels which are used in the correlation operation, thereby reducing the amount of computation. Once a lesser number of sample pixels have been generated, these sample pixels are then used in the pattern matching algorithm to locate instances of the template image in the target image.

Prior art techniques for characterizing the template image have utilized a homogeneous sampling of the template, such as a grid-based sampling of the template. Another prior art technique is to utilize random points or pixels within the template image and to use these random sample pixels in the correlation-based pattern matching. However, each of the above prior art techniques operates to select a subset of the pixels in the template image which do not necessarily represent or characterize the template image well. In other words, homogeneous sampling or random sampling of the template image often does not produce an optimum subset of samples or pixels which best represent the pattern information of the template image.

Therefore, an improved system and method is desired for correlation based pattern matching. More particularly, an improved system and method is desired for characterizing or selecting samples or pixels from a template image which best represent the template image with the fewest samples possible. In addition, an improved system and method is also desired which reduces the number of correlation operations which are required in a pattern matching operation. Further, improved techniques are desired for performing pattern matching for rotated images, translated images, and images which are scaled in size.

Utilizing color information can often be used to simplify a grayscale pattern matching problem, e.g., due to improved contrast or separation of an object from the background. In machine vision applications, color is a powerful descriptor that often simplifies object identification and extraction from a scene. Color characterization, location, and comparison is an important part of machine vision and is used in a large class of assembly and packaging inspection applications. Inspection involves verifying that the correct components are present in the correct locations. For example, color information may be used in inspecting printed circuit boards containing a variety of components; including diodes, resistors, integrated circuits, and capacitors. These components are usually placed on a circuit board using automatic equipment, and a machine vision system is useful to verify that all components have been placed in the appropriate positions.

As another example, color information is widely used in the automotive industry to verify the presence of correct components in automotive assemblies. Components in these assemblies are very often multicolored. For example, color characterization may be used to characterize and inspect fuses in junction boxes, i.e., to determine whether all fuses are present and in the correct locations. As another example, it is often necessary to match a fabric in one part of a multi-color automobile interior. A color characterization method may be used to determine which of several fabrics is being used.

A color space (or color model) is a way of representing colors and their relationship to each other. A color space is essentially a multi-dimensional (e.g., 3-D) system and a subspace within that system where each color is represented by a single point or vector. Image processing and machine vision systems use several different color spaces including RGB, HSI (or HSL), and CMY. In the RGB space, each color appears in its primary spectral components of red, green, and blue. This RGB color space is based on a Cartesian coordinate system. The RGB model is represented by a 3-dimensional cube with red, green, and blue at the edges of each axis. Each point in the cube represents a color, and the coordinates of that point represents the amount of red, green and blue components present in that color. Because the red, green, and blue color components in RGB color space are highly correlated, it is difficult to characterize colors with intensity/luminance independent features.

The Hue, Saturation, Intensity (HSI) or Hue, Saturation, Luminance (HSL) color space was developed to put color in terms that are easier for humans to quantify. The hue component is color as we normally think; such as orange, green, violet, and so on (a rainbow is a way of visualizing the range of hues). Thus, hue represents the dominant color as perceived by an observer. Saturation refers to the amount or richness of color present. Saturation is measured by the amount of white light mixed with a hue. In a pure spectrum, colors are fully saturated. Colors such as pink (red and white) and lavender (purple and white) are less saturated. The intensity or light component refers to the amount of grayness present in the image.

Colors represented in HSI model space may be ideal for machine vision applications for two reasons. First, HSI includes an intensity (luminance) component separated from the color information. Second, the intimate relation between hue and saturation more closely represents how humans perceive color. It is therefore desirable to characterize colors in HSI space for color measurement and color matching.

HSI is modeled with cylindrical coordinates. One possible model comprises the double cone model, i.e., two cones placed end to end or an inverted cone below another cone (see FIG. 4). For information on the double cone model, please see "A Simplified Approach to Image Processing", Randy Crane, Prentice Hall, 1997. The hue is represented as the angle theta, varying from 0 degree to 360 degree. Saturation corresponds to the radius or radial distance, varying from 0 to 1. Intensity varies along the z-axis with 0 being black and 1 being white. When S=0, the color is gray scale with intensity I and H is undefined. When S=1, the color is on the boundary of the top cone base and is fully saturated. When I=0, the color is black and therefore H is undefined.

On the assumption that the R, G and B values have been normalized to range from 0 to 1, the following equations may be used to convert from RGB color space to HSI (or HSL) color space:

$$I=(R+G+B)/3$$

$$H = \cos^{-1}\left\{\frac{\frac{1}{2}[(R-G)+(R-B)]}{[(R-G)^2+(R-B)(G-B)]^{\frac{1}{2}}}\right\}$$

$$S = 1 - \frac{3}{(R+G+B)}[\min(R, G, B)]$$

The Intensity I (or Luminance L) may also be represented by the equation:

$$L=0.299R+0.587G+0.114B$$

which is a weighted sum of the RGB values.

The equation for H yields values in the interval [0°,180°]. If B/I>G/I then H is greater than 180° and is obtained as H=360°−H.

Prior art in color machine vision systems use various techniques to measure and match colors. Those skilled in the art will be familiar with 'thresholding' an image. To threshold a color image, a threshold is applied to each of the three planes that make up the image. In RGB mode, to select a particular color, one will need to know the red, green and blue values that make up the color. In RGB mode it is not possible to separate color from intensity. Therefore, a characterization algorithm such as histogram Intersection based on RGB space will be intensity sensitive. For more information on this, please see "Color Indexing", Michael J. Swain, Internal Journal of Computer Vision, vol. 7:1, page 11–32, 1991.

In the HSI color space, since the color and intensity information can be separated, one usually thresholds the color image in the hue plane to identify the dominant color (hue). However, it is difficult to distinguish multiple color objects by the thresholding technique, especially when the saturation has to be taken into account. Moreover, the black and white colors are the background colors in many machine vision applications and chromaticity (i.e. hue and saturation) can not be used to represent them. Therefore, The intensity value will also have to be used to represent black and white colors in the machine vision applications.

Prior art color matching techniques commonly calculate the color difference between corresponding pixels of a target object and a template object. These prior art techniques generally perform pixel by pixel comparisons or subtractions between pixels of the target object and pixels of the template object. The results of these pixel by pixel comparisons may then be compiled to determine the level of color similarity between the entire target object and template object. The computation cost of pixel by pixel comparison is very expensive and is difficult to accomplish in real time. A more efficient color match method is desirable. More specifically, it is desirable to enable machine vision applications to more effectively characterize and compare the colors in images.

U.S. Pat. No. 5,410,637 (Kern) uses fuzzy logic to establish acceptable pass/fail tolerances for production or inventory samples. The process first stores a series of training image samples which are labeled pass or fail according to visual inspections. The initial value of the tolerance is a super ellipsoid determined by the high/low value of the pass samples in the training set. A classifier template uses the super ellipsoid tolerances and ranks every sample in the training set. The process then employs fuzzy logic to obtain an optimized tolerance which minimizes the sum of ranking error between the classifier template and the visual ranks. The process essentially builds a pass/fail color classifier. This process cannot be used to measure the colors quantitatively in an image or to measure the quantitative color similarities between two objects in an image or in two separated images.

U.S. Pat. No. 5,085,325 (Jones) implements a color sorting system and method. The method creates a lookup table containing a series of 0's (accept) and 1's (reject) based on good and bad sample images. During the sorting process, the pixel value of the input image is used to address the lookup table, the output of the lookup table is either 1 or 0. If the number of rejects (1's) accumulated is larger than a specified number K, the input image is rejected. This color sorting method is based on a pixel by pixel comparison. A large memory is required to store the lookup table. Although a special hardware addressing approach can improve the processing speed, the cost of computation is still very high for sorting objects with complex colors.

U.S. Pat. No. 5,751,450 (Robinson) provides a method for measuring the color difference of two digital images as a single 'distance.' This 'distance' is an average of the color differences of all corresponding pixels of the two images. Similar to the Jones' patent as described above, the cost of computation of the distance is very high. This template image has to be stored in the computer memory for on-line color matching. If the size of the template and target image are not the same, special operations for alignment or resizing the image must be done before the matching process can begin. A further drawback of this approach is that it is impossible to have scale and rotation-invariant color matching based on the 'distance' measure.

SUMMARY OF THE INVENTION

One embodiment of the present invention comprises a system and method for locating regions in a target image that match, at least to a degree, a template image with respect to color and pattern information. A template image comprising a plurality of pixels may be received by a computer system. A color characterization analysis may be performed in order to determine color information of the template image. A method to characterize the pattern information of the template image may also be performed.

A target image, such as an image acquired by a camera for a machine vision application, may then be searched in order to find zero or more regions in the target image matching the color and pattern information of the template image. In various embodiments, user input may be received which specifies options to use in performing the search, such as options relating to a desired matching granularity or options affecting the search efficiency and time requirements.

The search may comprise performing a first-pass search using color information obtained in the color characterization analysis of the template image in order to find a plurality of color match candidate regions, i.e., regions in the target image that match the template image with respect to color. For example, a color characterization analysis of various regions within the target image may be performed, and the color information for each region may be compared to the color information of the template image in order to determine whether the region matches the template image with respect to color. The color matching criteria used in this first-pass search may be relatively loose, i.e., a region that is analyzed may not need to match the color information of the template image very closely in order to be considered a color match candidate region.

For each color match candidate region found in the first-pass search, a region proximal to or surrounding each color match candidate region (the "proximal region" or "surrounding region") may then be searched in detail, based on pattern information obtained in the pattern information characterization of the template image. Pattern-based searches are summarized below. This pattern matching search of the "proximal regions" may produce zero or more match regions in the target image. The zero or more match regions found in the pattern matching search of each surrounding region match the template image with respect to color and pattern information according to some desired metric or degree of closeness.

In one embodiment, the color characterization analysis method performed for the template image and for target image regions comprises determining, for each pixel in the image, a color category for the pixel based on values of the respective pixel, i.e., hue, saturation and intensity values, wherein the color category is one of a plurality of possible color categories or bins (or sub-spaces) in the HSI space. The number of pixels assigned to each category is then counted and normalized by the total number of pixels in the image. In other words, the percentage of pixels in each color category characterizes the colors of the image. The percentage of pixels in each color category may also be used as a quantitative measurement of the color distribution of the image.

The first-pass color match search may involve sampling the color information of the target image at various regions, e.g., by performing the color characterization method described above for successive regions in the target image, wherein the regions are offset from each other by a step size. The color characterization method may be performed based on all or a subset of the target image region pixels. At each region, a measure of difference between the color information of the region and the color information of the template image may be determined, and if the difference is sufficiently small, the region may be designated as a candidate color match region. For each candidate color match region, information obtained in the pattern characterization method performed on the template image may then be used to perform a pattern-matching method in a larger region proximal to or surrounding the candidate color match region.

In one embodiment, the pattern characterization method performed on the template image comprises sampling the template image using a Low Discrepancy sequence, also referred to as a quasi-random sequence, to determine a plurality of sample pixels in the template image which characterize the pattern information of the template image. This sample information may be stored for later use. In various embodiments, the template image may be sampled in different color space planes. For example, in one embodiment, the image may be sampled in each the hue plane, saturation plane, and/or luminance plane.

The Low Discrepancy sequence may be designed to produce sample points which maximize the distance between sample points. Also, the Low Discrepancy sequence sampling may result in fewer points and/or a better characterization of the template image pattern information than a random sequence sampling or a uniform sampling. Examples of the Low Discrepancy sequence include Halton, Sobol, Faure, and Niederreiter sequences. The sampling or characterizations of the template image pattern and color information are preferably performed off-line prior to receipt of a target image. Thus, the analyses of the template image are preferably not constrained by real time requirements. After the candidate color match regions have been determined, pattern information of a region proximal to or surrounding each color match region may be compared to the pattern information of the template image, using the sample points determined in the pattern characterization method.

In another embodiment, the pattern characterization may involve sampling the template image, wherein the template image comprises a first plurality of pixels, and wherein the sampling produces a second lesser number of sample pixels. This sampling may use any of various sampling techniques, including a Low Discrepancy sequence as described above. A local stability analysis is then performed around at least a subset of the sample pixels to determine a lesser third number of sample pixels which have a desired degree of stability. The local stability analysis operates to ensure stability of each of the subset of sample pixels to spatial perturbations around the sample pixel. For each pixel, the local stability analysis preferably comprises finding a neighborhood around the sample pixel where the value, e.g., the grayscale value, of the sample pixel correlates highly with the template image pixel values in the neighborhood. The local stability analysis is preferably performed for all of the sample pixels. The third plurality of sample pixels may then be used in the pattern matching.

In one embodiment, the local stability analysis determines a plurality of sets of sample pixels with differing stability neighborhood sizes, and the pattern matching performed for each region surrounding a candidate color match region comprises performing a plurality of iterations of pattern matching using different sets of sample pixels. The iterations are preferably performed in a coarse to fine manner, e.g., using sets of sample pixels with successively smaller stability neighborhood sizes. This plurality of iterations of pattern matching may also use different step sizes for each of the different sets of sample pixels, wherein the step size preferably corresponds with the stability neighborhood size. Thus the plurality of iterations of pattern matching in the coarse to fine manner preferably uses sets of sample pixels with successively smaller stability neighborhood sizes and/or successively smaller step sizes. For example, a first iteration of pattern matching may determine one or more candidate pattern match regions in the region which possibly match the pattern information of the template image, and one or more second iterations of pattern matching may then be performed at the determined one or more candidate pattern match regions in the region, and so on.

The techniques described herein may also be used to perform pattern matching to locate one or more instances of a rotated or scaled color template image in a color target image. The pattern characterization of the template image may comprise first sampling the template image along one or more rotationally invariant paths, preferably circular perimeters, to produce one or more sets of sample pixels. The pattern matching performed may then use a cyclic correlation between each of the one or more sets of sample pixels and the target image to determine zero or more regions of the template image in each region surrounding a color match candidate region. This pattern matching detects rotated versions of the template image in the target image.

In one embodiment, a local stability analysis around at least a subset of the sample pixels may be performed. The pattern matching may then use one or more sets of sample pixels along one or more circular perimeters based on the local stability analysis. The local stability analysis preferably determines a plurality of sets of sample pixels with differing stability neighborhood sizes. In this case, the pattern matching comprises performing a plurality of iterations of pattern matching using different sets of sample pixels, preferably in a coarse to fine manner, e.g., using sets of sample pixels from circular paths with successively smaller stability neighborhood sizes. The pattern matching may also use different step sizes for each of the different sets of sample pixels. As discussed above, a first iteration of pattern matching within each region may determine one or more candidate pattern match locations and corresponding rotation values in the target image, and one or more second iterations of pattern matching may be performed at the determined one or more candidate pattern match locations in the region using the respective rotation values, and so on. A final pattern matching may utilize substantially all of the template image pixels at the respective candidate locations and using the determined rotation values.

BRIEF DESCRIPTION OF THE DRAWINGS

A better understanding of the present invention can be obtained when the following detailed description of the preferred embodiment is considered in conjunction with the following drawings, in which.

Figure 1:
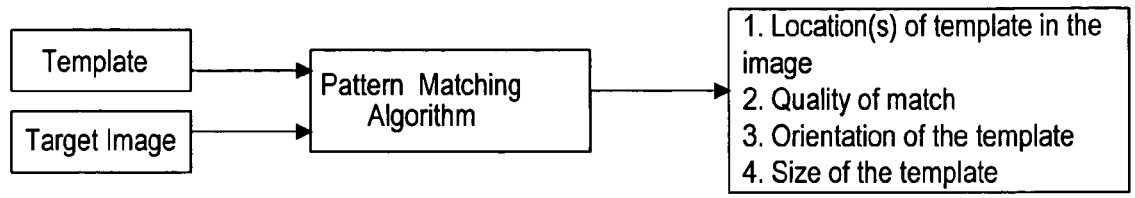
FIG. 1 illustrates pattern matching as performed in prior art.
Figure 2:
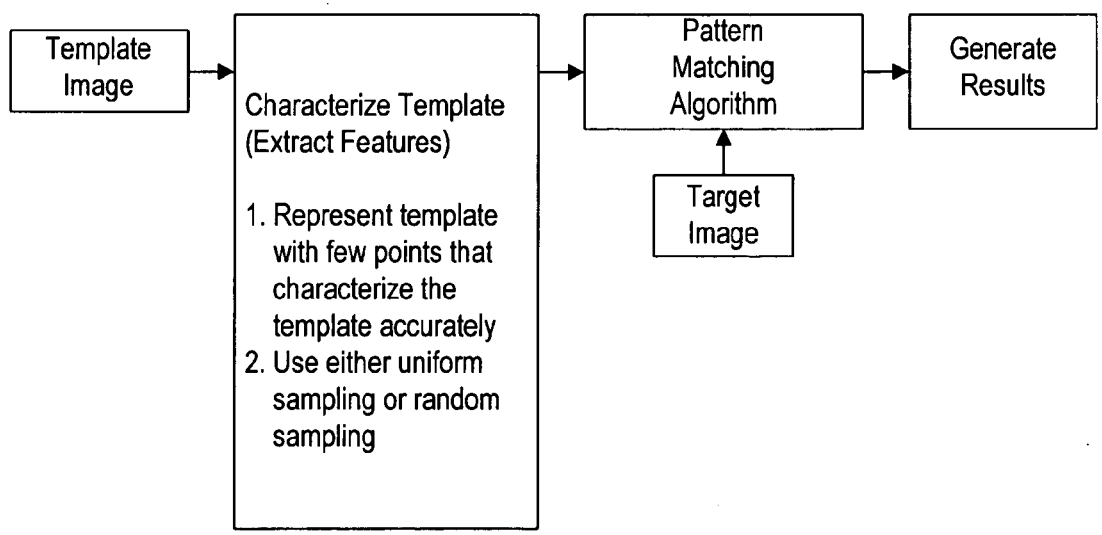
FIG. 2 illustrates pattern matching performed in prior art, which includes characterization of the template image with fewer pixels for reduced computation.

While the invention is susceptible to various modifications and alternative forms specific embodiments are shown by way of example in the drawings and are herein described in detail. It should be understood, however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following patent applications are hereby incorporated by reference in their entirety as though fully and completely set forth herein:

U.S. patent application Ser. No. 09/375,453 titled "System and Method for Color Characterization with Applications in Color Measurement and Color Matching" filed on Aug. 17, 1999, whose inventors are Siming Lin and Dinesh Nair;

U.S. patent application Ser. No. 09/227,506 titled "Pattern Matching System and Method Which Performs Local Stability Analysis for Improved Efficiency" filed on Jan. 6, 1999, whose inventors are Dinesh Nair, Lothar Wenzel, Nicolas Vazquez, and Samson DeKey;

U.S. patent application Ser. No. 09/639,420 titled "System and Method for Locating Color Match Regions in a Target Image," filed on Aug. 14, 2000.

Figure 3:
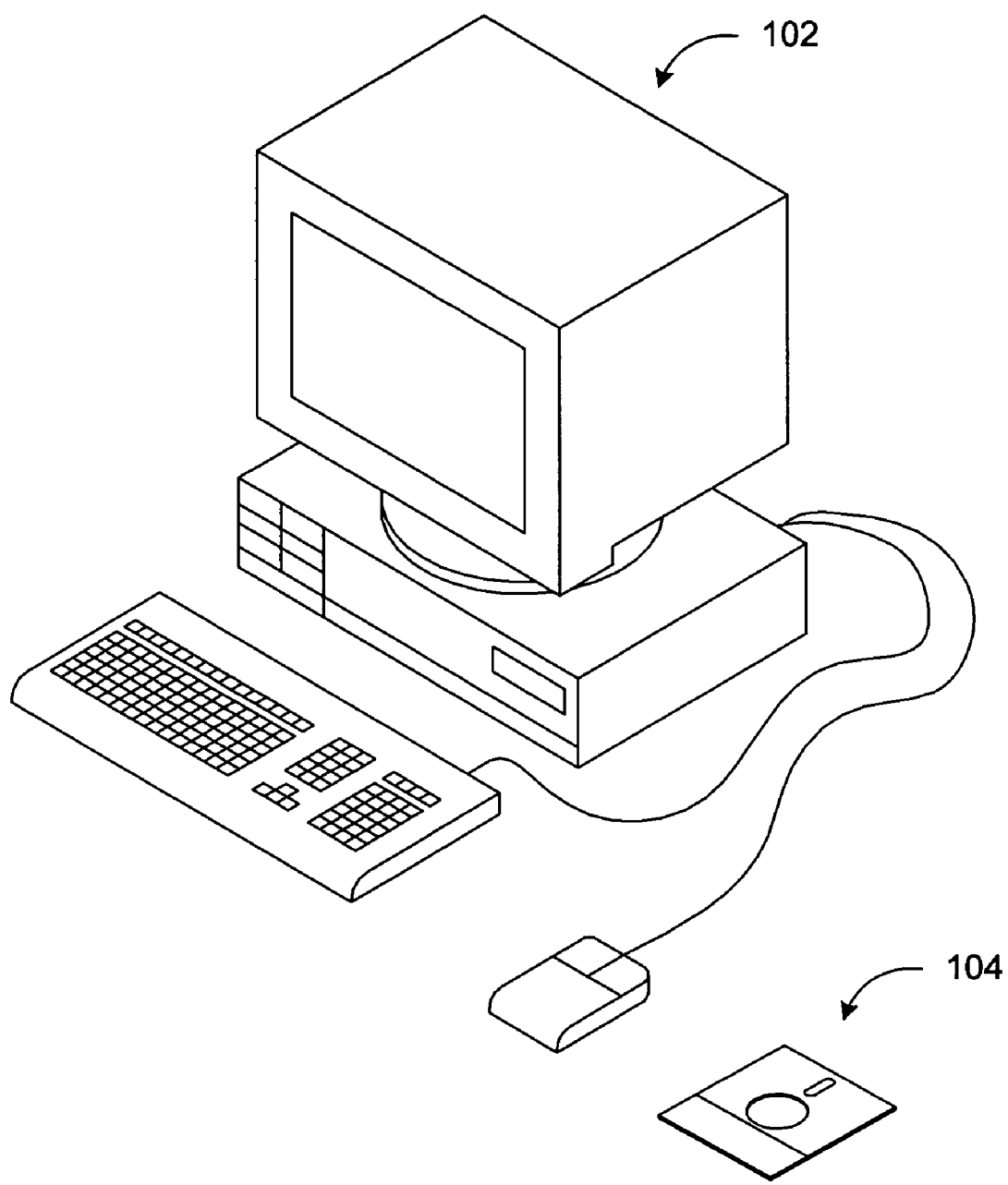
FIG. 3 illustrates a computer system that performs color and pattern matching according to the present invention.

FIG. 3—Computer System

FIG. 3 illustrates a computer system 102 which may perform color and pattern match location according to the present invention. The computer system 102 may comprise one or more processors, a memory medium, display, and an input device or mechanism, such as a keyboard or mouse, and any other components necessary for a computer system.

The computer system 102 may perform a color characterization method and a pattern characterization method of a template image and may use information determined in these analyses to locate regions of a target image which match the template image, with respect to color and pattern information. Images that are to be matched are preferably stored in the computer memory and/or received by the computer from an external device.

The computer system 102 preferably includes one or more software programs operable to perform the color and pattern match location. The software programs may be stored in a memory medium of the computer system 102. The term "memory medium" is intended to include various types of memory, including an installation medium, e.g., a CD-ROM, or floppy disks 104, a computer system memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The software program(s) may be implemented in any of various ways, including procedure-based techniques, component-based techniques, graphical programming techniques, and/or object-oriented techniques, among others. For example, the software program may be implemented using ActiveX controls, C++ objects, Java Beans, Microsoft Foundation Classes (MFC), or other technologies or methodologies, as desired. A CPU, such as the host CPU, executing code and data from the memory medium comprises a means for performing color and pattern match location according to the methods or flowcharts described below.

Figure 4:
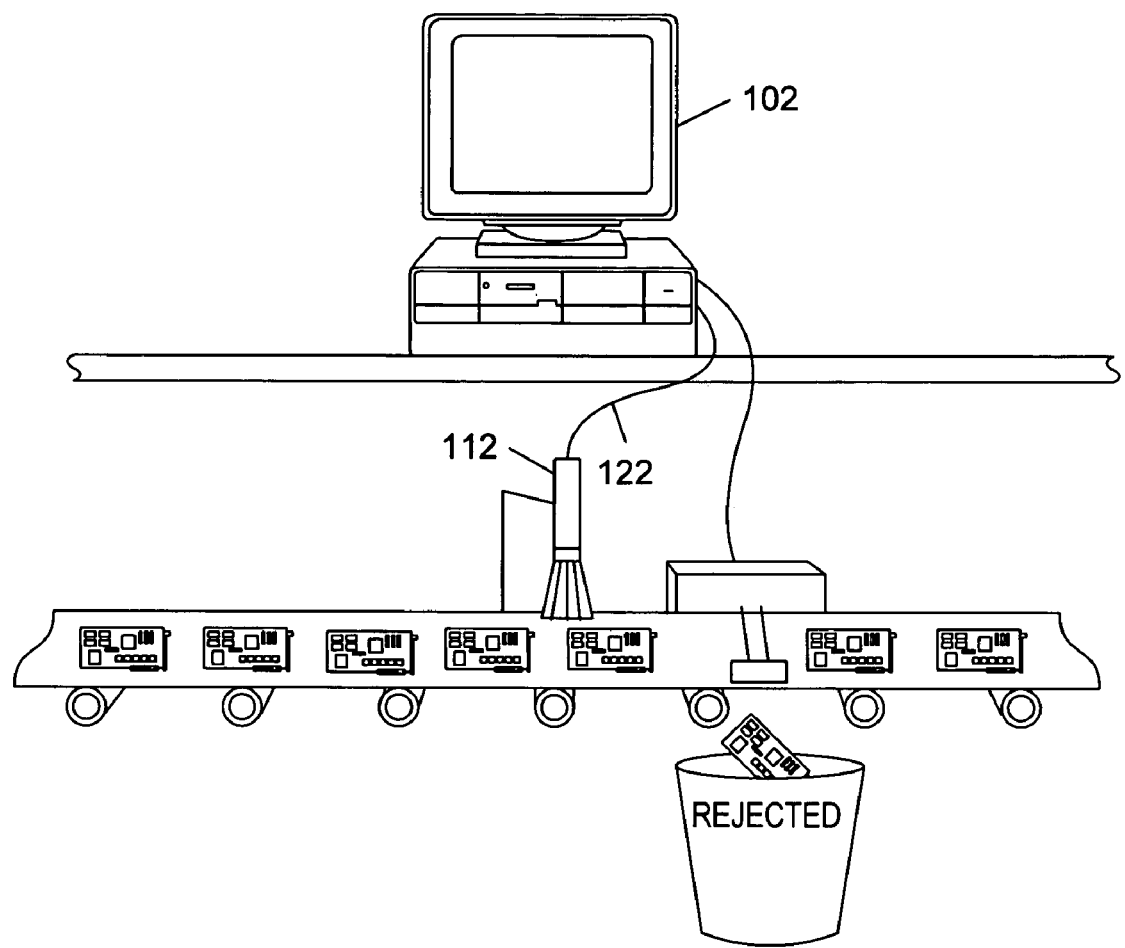
FIG. 4 illustrates an image acquisition (video capture) system for acquiring images.

FIG. 4—Machine Vision System

FIG. 4 illustrates a machine vision system or image acquisition system, which is an example of one application of the present invention. The color and pattern match location techniques described herein may be used in various types of machine vision or motion control applications. For example, the computer 102 may be embodied in various form factors and/or architectures, e.g., a robot or embedded device, among others. It is also noted that the color and pattern match location techniques described herein may be performed in any of various manners, either in software, programmable logic, or hardware, or a combination thereof.

In the machine vision system of FIG. 4, computer system 102 is coupled to a camera 112 and operates to receive one or more images. The computer system 102 may be operable to perform a color characterization method to characterize the colors in a template image and to perform a pattern characterization method to determine pattern information of the template image. In the present application, the term "template image" is used to refer to either an entire image, or a portion of an image, e.g., a region of interest (ROI). The computer system 102 may also be operable to perform a search of a target image to locate target image regions that match the color and pattern information of the template image. As described below, the search may be performed to locate matching regions with any of various degrees of exactness, as appropriate for a particular application.

Figure 5:
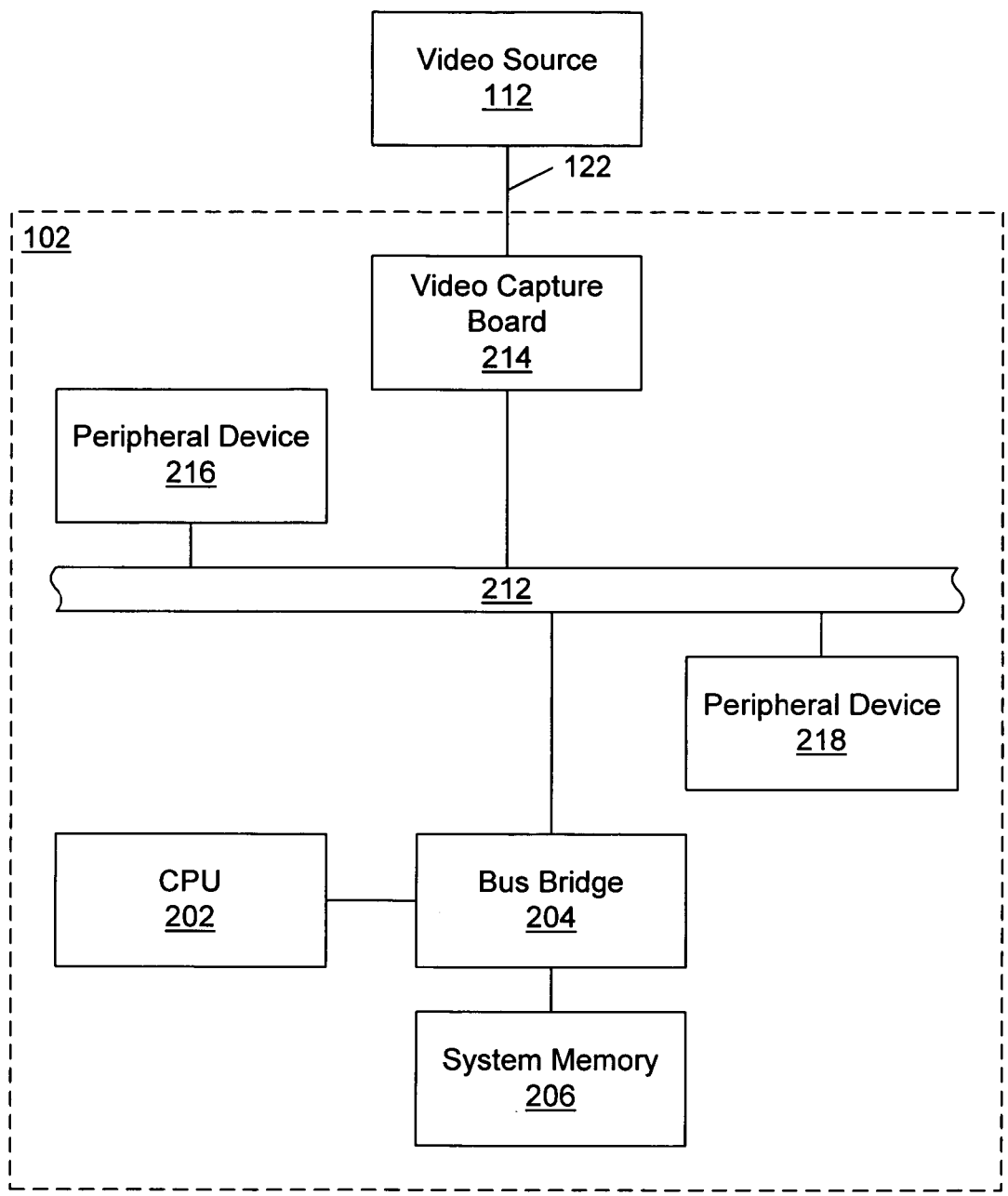
FIG. 5 is a high-level block diagram of the image acquisition system.

FIG. 5—Image Acquisition System Block Diagram

FIG. 5 is a high-level block diagram of the image acquisition system of FIG. 4 for acquiring an image for color and pattern matching according to the present invention. It is noted that the block diagram of FIG. 5 is exemplary only, and other computer system architectures may be used as desired. For example, the present invention may be implemented in a "smart camera", which integrates a sensor, analog to digital (A/D) converter, CPU, and communications devices together in a single unit. The present invention may be embodied in other architectures, devices, or embodiments, as desired.

As shown in FIG. 5, the host computer 102 preferably comprises a CPU 202, a bus bridge 204, system memory 206, and a peripheral bus 212. The CPU 202 is coupled to the bus bridge 204. The bus bridge 204 is coupled to the system memory 206 and the CPU 202, and couples to the peripheral bus 212. In the preferred embodiment, the peripheral bus 212 is the PCI expansion bus, although other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the analog or digital video signals to the video capture board 214. The video capture board 214 transfers digitized video frames to the system memory 206 through peripheral bus 212 and bus bridge 204. In this embodiment, the video capture board 214 acquires the target image and transfers it to system memory 206. One or more regions of interest (ROI) may be specified in the target image which are desired to be searched for regions having color and pattern information that matches the color and pattern information of a template image, or the entire target image may be searched.

The system memory 206 may store a template image. The system memory 206 may also receive and/or store one or more other images, such as selected ROIs in the template image or another image, or acquired target images. The system memory 206 also preferably stores software according to the present invention which operates to analyze the color and pattern information of the template and target images. The software may also be executable to perform various color and pattern match location methods, as described below. The system memory 206 may store the color characterization and pattern information of the template image for comparison to various regions in the target image during the color and pattern match location process.

The term "image," as used herein, may refer to any of various types of images. An image may be obtained from any of various sources, including a memory medium. An image may, for example, be obtained from an image file, such as a BMP, TIFF, AIPD, PNG, JPG, or GIF file, or a file formatted according to another image format. An image may also be obtained from other sources, including a hardware device, such as a camera, frame grabber, scanner, etc. An image may be a complex image, in which pixel values have a real part and an imaginary part.

It is noted that, in a color and pattern match location application, the color characterization and pattern information of the template image may be pre-calculated and stored in the computer, and the actual template image is then not required to be stored or used for subsequent color and pattern match location operations with respective target images. Thus, when a target image is acquired, the software may compare the color and pattern information of the target image with the pre-computed color and pattern information of the template image.

The present invention is preferably implemented in one or more software programs which are executable by a processor or CPU. The software program(s) of the present invention are preferably stored in a memory medium of a computer as described above.

Figure 6:
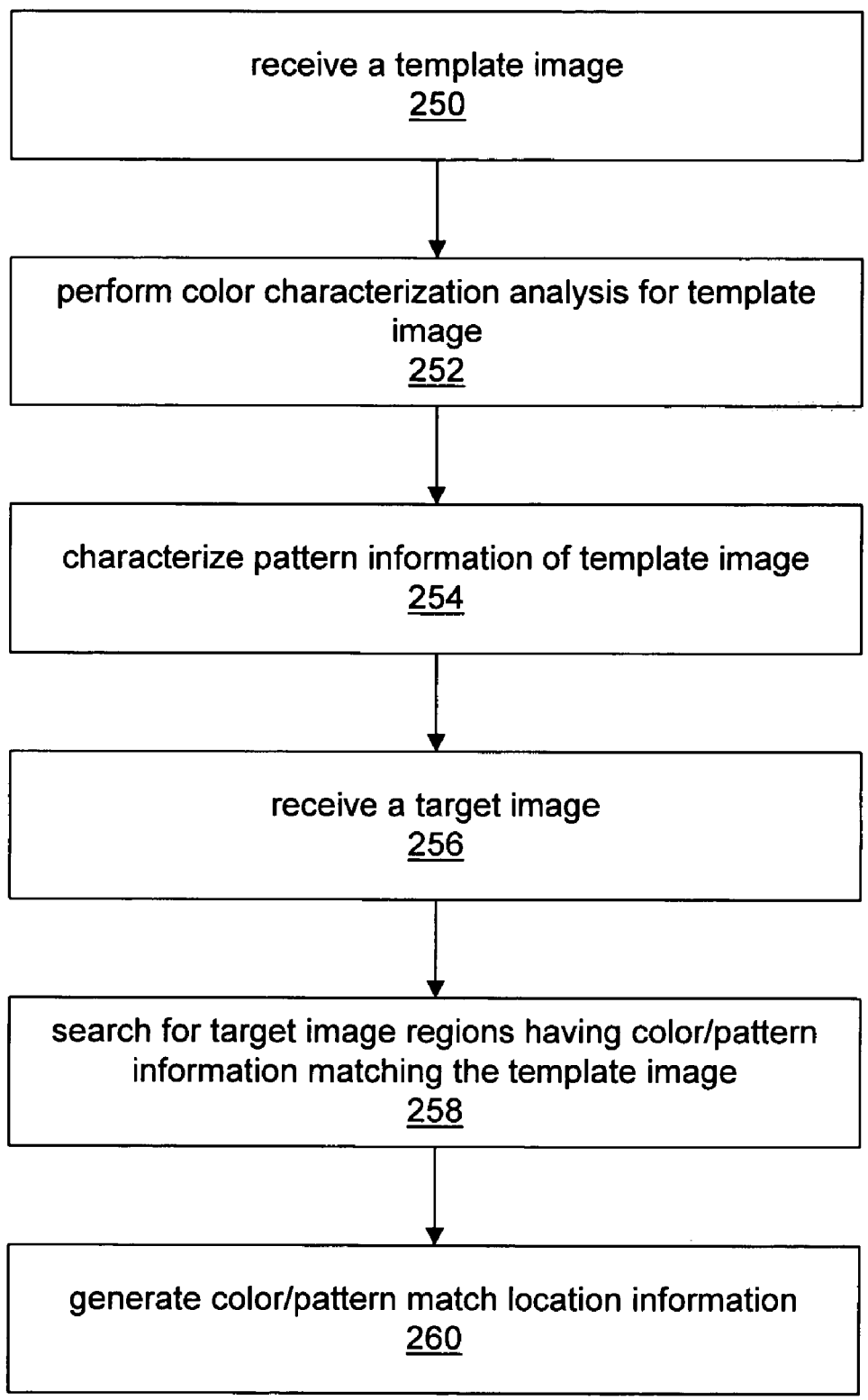
FIG. 6 is a flowchart diagram illustrating one embodiment of a method for locating regions of a target image that match a template image, with respect to color and pattern information.

FIG. 6—Color Match Location Method

FIG. 6 is a flowchart diagram illustrating one embodiment of a method for locating regions of a target image that match a template image, with respect to color and pattern information.

In step 250, a template image may be received. The template image may be an image of any of various types, as described above. The template image may be received or obtained from any of various sources and may be an entire image or may be a portion of an image, e.g., a region of interest specified by a user. For example, a user may select a region of interest (ROI) using a graphical user interface (GUI). In one embodiment, a GUI may enable the user to choose from many different shapes of ROIs, such as a rectangle, an oval, or a shape selected freehand.

In step 252, a color characterization method may be performed for the template image. In one embodiment, this method may involve dividing the HSI color space into a number of categories or "bins". The color information of the template image pixels may then be examined in order to determine the allocation of the pixels across the bins. One particular embodiment of step 252 is described in detail below. In alternative embodiments, any of various other methods may be used as the color characterization method.

In step 254, a pattern characterization method may be performed for the template image. This method may involve determining a plurality of sample pixels, or a set of pluralities of sample pixels, that characterize the pattern information of the template image well. Particular embodiments of step 254 are described in detail below.

In step 256, a target image may be received. Similarly as for the template image, the target image may also be an image of any of various types, including an image obtained from a memory medium or an image acquired from a hardware device, such as a camera, frame grabber, scanner, etc. The target image may also be received from any other source, including from a graphics software program, from transmission via a network, etc. A target image may also be an entire image or only a portion of an image.

It is noted that in alternative embodiments, multiple template images and/or target images may be received or specified. For example, it may be desirable to search multiple target images for regions having color and pattern information matching that of a template image, or it may be desirable to search for target image regions matching any of a plurality of template images.

In step 258, the target image may be searched in order to locate regions that match the template image with respect to color and pattern information. This search may utilize the color characterization and pattern information of the template image obtained in steps 252 and 254 and may also involve performing color characterization analyses for various regions of the target image. Step 258 may be performed in any of various ways. In one embodiment the target image may be searched in multiple passes. The first pass may involve a search based on color information to efficiently identify a list of candidate regions in the target image matching the template image with respect to color. Subsequent passes may then use pattern information or pattern matching to examine regions proximal to or surrounding each of the color match candidate regions ("proximal regions" or "surrounding regions") more closely in order to determine final matches or final match regions in the target image.

The proximal regions are preferably larger than the color match candidate regions, i.e., each proximal region preferably surrounds its corresponding color match candidate region. Alternatively, the proximal regions may be the same size as, or possibly smaller than, the respective color match candidate regions.

The zero or more match regions found in the pattern matching search of each proximal region may match the template image with respect to color and pattern information according to some desired metric or degree of closeness. One specific embodiment of step 258 is discussed in detail below.

In step 260, color and pattern match location or analysis information may be generated based on the results of step 258. Step 260 may involve displaying information, such as visually indicating the location or orientation of the match regions within the target image, and/or displaying information indicating various statistics or graphs regarding the color and/or pattern information of the match regions or regarding how closely the regions match the color/pattern information of the template image.

In many applications, it is necessary or desired to perform the color and pattern matching in real time when the target image is acquired. In machine vision applications, "real time" often refers to "video real time", i.e., to performing the function for every single image acquired by the camera, e.g., for a NTSC camera that acquires 30 frames/second. For example, in the machine vision embodiment shown in FIG. 4, the color and pattern matching is preferably performed in real time when the target image is acquired by the camera 112. In these real time embodiments, the template image may be pre-stored in the computer 102, and there is generally a large amount of time in which to characterize the color and pattern information of the template image. Once these characterizations have been performed, the system can perform the color and pattern matching methods a plurality of times for a plurality of acquired target images, preferably in real time.

Figure 7:
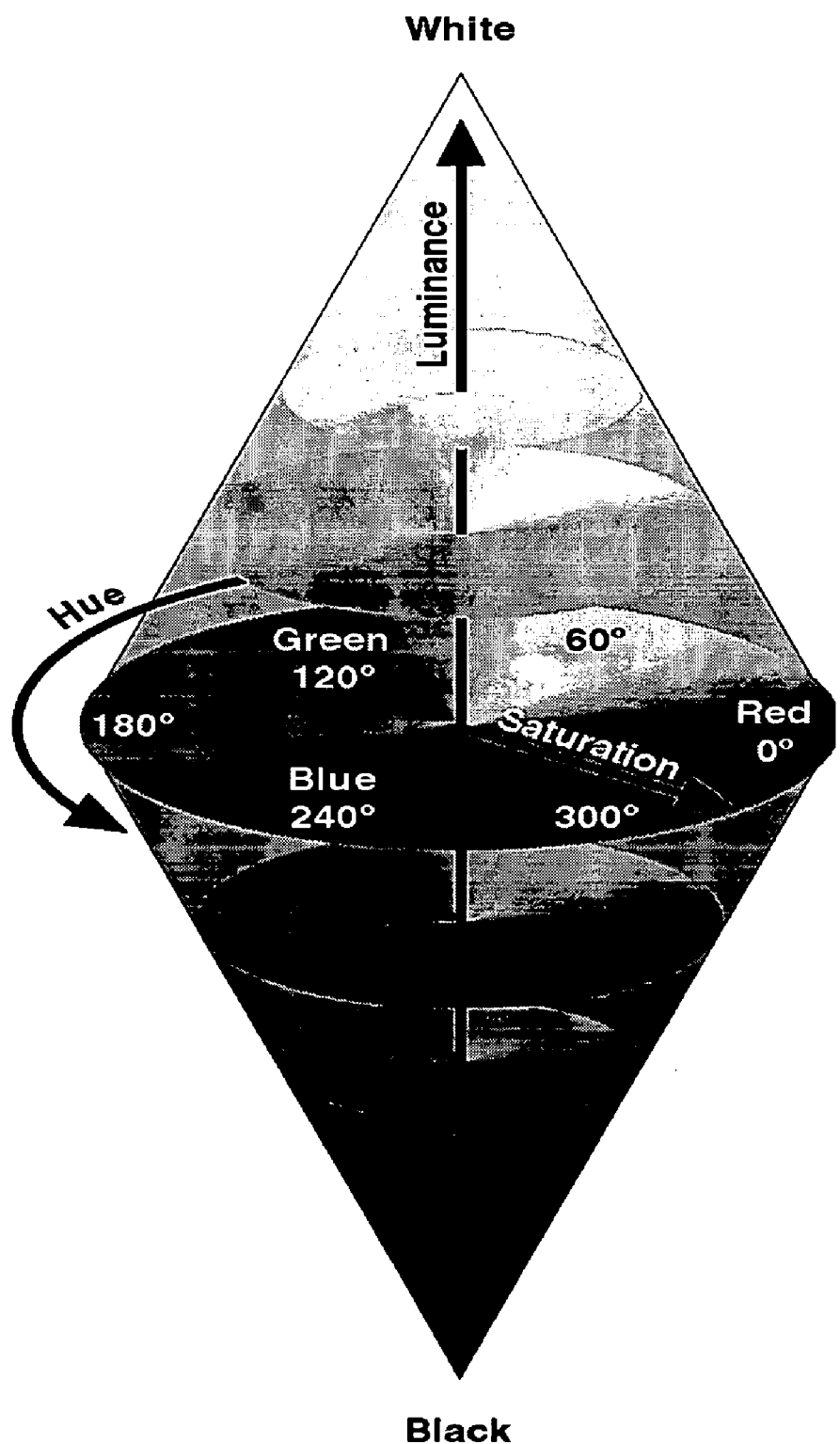
FIGS. 7, 8A, and 8B are graphical representations of HSI color space and HSI color space partitioning.
Figure 8A:
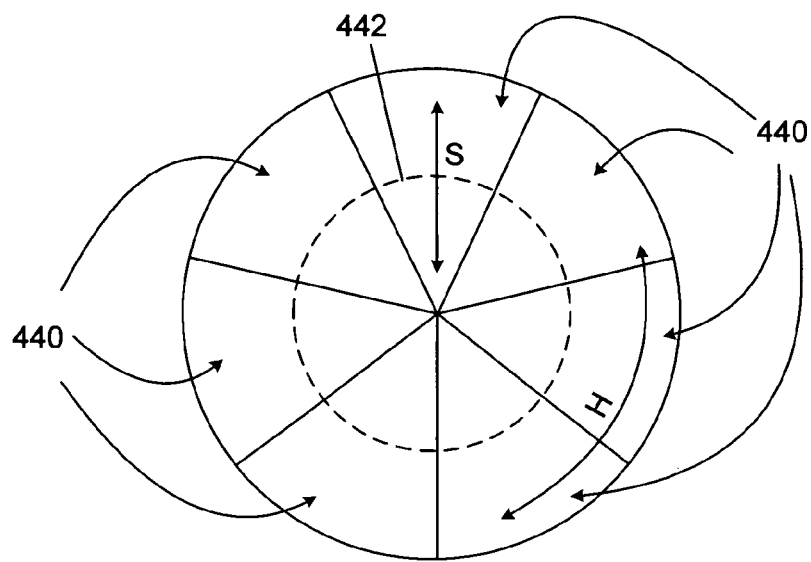
Figure 8B:
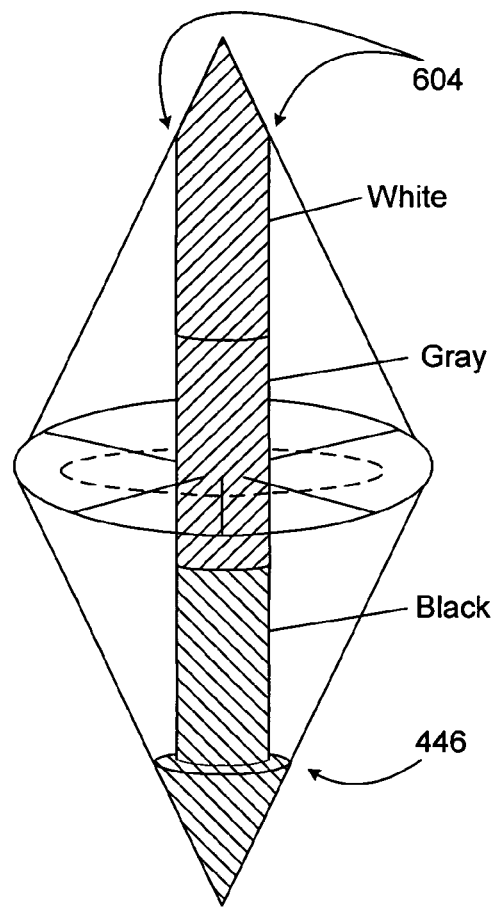

FIGS. 7, 8A, 8B—HSI Color Space

In one embodiment, characterizing the color information of a template image and/or target image may utilize HSI (hue, saturation, intensity) information. The HSI information of individual pixels of an image may be analyzed, and the pixel-specific results may be compiled in order to characterize the image based on color. In one embodiment, the color characterization method divides the color spectrum or color space into categories or "bins" (also called subspaces), primarily according to hue and saturation values, and then operates to assign pixels to respective ones of these bins. The total number of pixels (or percentage of pixels) in an image that fall into each category or bin of the color spectrum may then be used as the basis of the color characterization.

FIG. 7 illustrates the possible hue, saturation, and intensity values (the color spectrum) as a 3-dimensional space or volume. The color information of a given pixel may be represented as a vector or point within the 3D color space or volume shown in FIG. 7. The vector's location represents the hue, saturation, and intensity of the pixel.

Hue represents the color shade of a pixel and is shown as an angle of a radial line in the circle in FIG. 7. FIG. 8A illustrates a cross section of FIG. 7. As shown in FIG. 8A, hue is represented as an angular value ranging from 0–360 degrees.

Saturation refers to a color's freedom from mixture or dilution with white. Saturation is represented in FIG. 7 as the radial distance of a line on the circle, i.e., the distance from the center of the circle. Saturation may be more easily seen in the cross section of FIG. 8A. Saturation typically is measured in the range of 0 to 1, with 0 being at the center of the circle and 1 being at the outside perimeter of the circle. Thus, hue and saturation are essentially represented in polar coordinates to describe a point or location on the circle of FIGS. 7 and 8A.

Intensity, sometimes referred to as light or luminance, refers to the degree of shade in a pixel and is represented on the vertical scale of FIG. 7, i.e., vector locations above or below the circle. The terms luminance and intensity are interchangeable throughout this description. Intensity values typically range from 0 to 1, with 0 being pure black and 1 being pure white. The intensity value 0 is represented at the apex of the bottom cone, and the intensity value 1 is represented at the apex of the top cone.

Before color characterization occurs, the color space of FIG. 7 may be partitioned into color categories. The color space may be partitioned into any number of categories or bins. The number of categories or bins determines the granularity or resolution of the color characterization. For example, for some applications a large degree of similarity between a template image and a target image region may be desired in order for the target image region to be considered as a match. Thus, a large number of categories or bins may be required in this instance. In various embodiments, user input may be received which specifies the desired complexity of the color characterization. In one embodiment, three possible complexity levels may be specified, these being low, medium, and high.

In the preferred embodiment, the low complexity level comprises 17 possible categories or bins. In the low complexity level, the hue plane (FIG. 8A) is divided into seven different bins 440 for the seven possible natural colors, and the saturation plane is divided into two regions, thereby creating 14 (7×2) bins. The seven possible natural colors comprise the 7 standard colors of the color spectrum, these being: red, orange, yellow, green, blue, indigo and violet. In the low complexity level, the hue plane is divided into seven pie-shaped wedges, and the saturation plane is further subdivided into 2 regions defined by a radial distance threshold 442, preferably 0.3 on a scale from 0 to 1, thereby creating 14 possible categories or bins in the hue/saturation plane. Three additional color categories are allotted for the pixel being characterized as black, gray, or white, thereby creating a total of 17 possible categories (14+3).

FIG. 8B illustrates the areas within HSI color space which may be categorized as either black, gray, or white. In general, the color of a specific pixel may be characterized as black, gray, or white if the saturation value is very low. The black, gray, and white categories are discussed in more detail below.

The medium complexity level may comprise 31 possible categories or bins. In the medium complexity level, the hue plane (FIG. 8A) is divided into 14 different color categories 440 and the saturation plane is divided into two regions, thereby creating 28 (14×2) bins. Thus, in the medium complexity level, the hue plane is divided into 14 pie-shaped wedges, and the saturation plane is further sub-divided into 2 regions defined by a radial distance threshold 442, preferably 0.3 on a scale from 0 to 1, thereby creating 28 possible color categories or bins in the hue/saturation plane. Three additional color categories are allotted for the pixel being black, gray, or white, thereby creating a total of 31 possible color categories (28+3).

The high complexity level may comprise 59 possible color categories or bins. In the high complexity level, the hue plane (FIG. 8A) is divided into 28 different bins 440, and the saturation plane is divided into two regions, thereby creating 56 (28×2) bins. Thus, in the high complexity level, the hue plane is divided into 28 pie-shaped wedges, and the saturation plane is further sub-divided into 2 regions defined by a radial distance threshold 442, preferably 0.3 on a scale from 0 to 1, thereby creating 56 possible color categories or bins in the hue/saturation plane. Three additional color categories are allotted for the pixel being black, gray, or white, thereby creating a total of 59 possible categories (56+3).

The saturation categorization, i.e., the location of the radial distance threshold 442, is preferably set to a default value, but may also be adjusted by the user setting the Learn Sat Threshold 604. The saturation threshold typically is only adjusted when color characterization is performed on images with little variance in color saturation. In another embodiment, the number of saturation divisions may be increased, for example, to 3 (or more), or may be decreased to 0 (i.e. colors are not divided with respect to saturation level).

Figure 9:
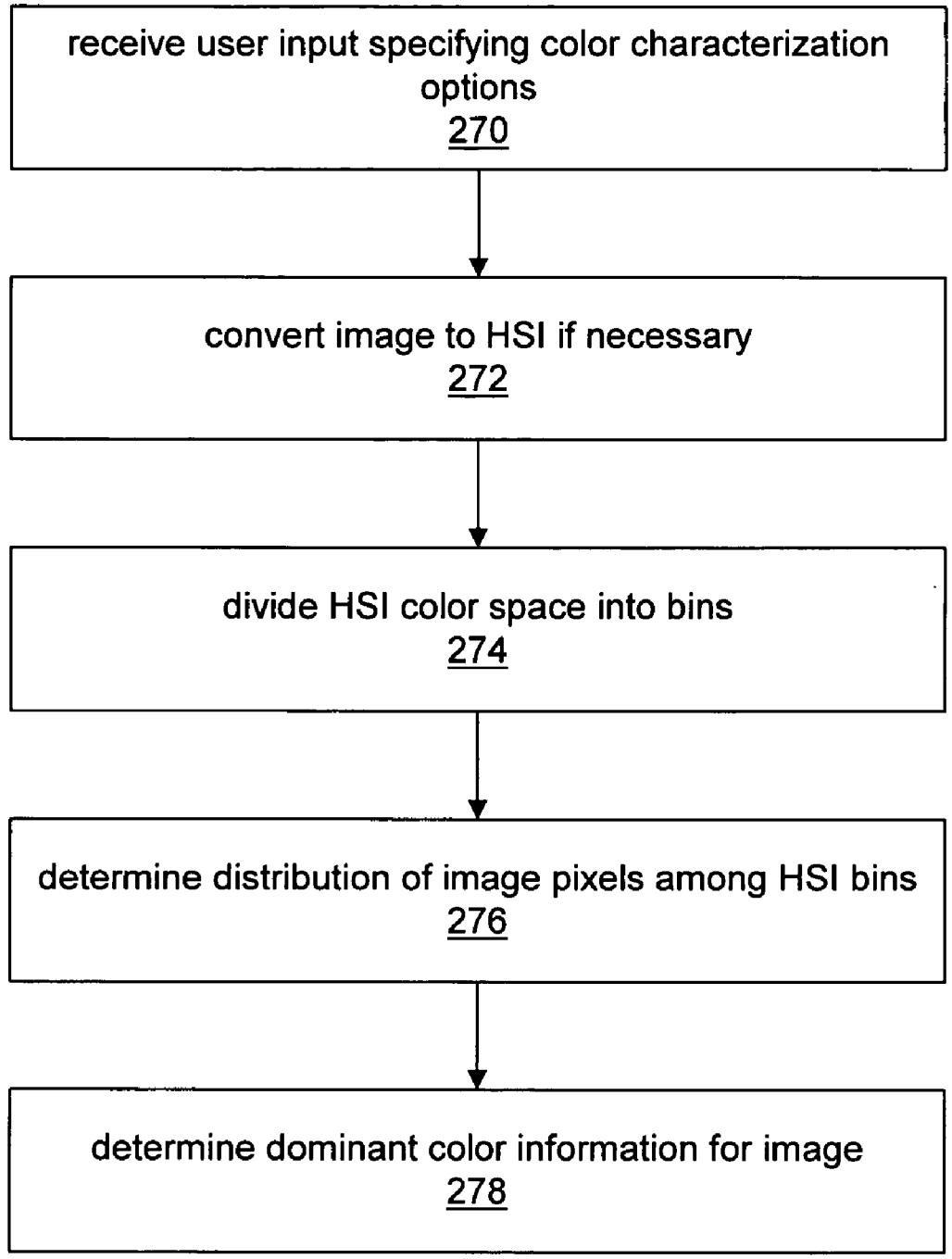
FIG. 9 is a flowchart diagram illustrating one embodiment of a method for characterizing color information of an image.

FIG. 9—Color Characterization Method

FIG. 9 is a flowchart diagram illustrating one embodiment of a method for characterizing color information of a template image and/or a target image. In one embodiment, the color characterization method shown in FIG. 9 may be utilized in step 252 of the flowchart shown in FIG. 6. It is noted that FIG. 9 represents one particular embodiment of a color characterization method. Various applications may require different levels of sensitivity with respect to characterizing colors in a template image and/or classifying target image regions as color match candidate locations. Various applications may also have different computational efficiency requirements. Thus, in alternative embodiments, any of various color characterization methods may be utilized.

It is noted that, for a template image, the color characterization method shown in FIG. 9 may be performed once and the color information for the template image may be stored and used as necessary. For a target image, the method of FIG. 9 may be performed multiple times for various regions of the image as the target image is searched.

The embodiment illustrated in FIG. 9 involves analyzing an image with respect to HSI color information. As shown in step 270, user input may be received which specifies various color characterization method options. For example, the user input may specify a color sensitivity level to use in analyzing the image, i.e., a desired resolution of color information. In one embodiment, the user may select one of three sensitivity levels, these being low, medium, and high. As described above with reference to FIG. 8A, the sensitivity level may determine the number of categories or bins into which to divide the HSI color space. It is noted that the number of color categories may be set to any number or level, as desired.

In step 272, the image may be converted to HSI format. Images are typically stored or received in RGB (Red, Green, Blue), Redness/Greenness, CMY, or HSI format. Thus, if an image is not in HSI format when received, it may be automatically converted to HSI format in step 272. The conversion process, when necessary, may analyze an image pixel by pixel, applying an algorithm that converts the current color format to the HSI format. It is noted that alternative embodiments of color characterization methods may utilize other color representation formats, such as RGB or CMY, among others. In these embodiments, for example, the RGB or CMY color spaces may be divided into color categories or bins, and pixels may be assigned to these bins.

In step 274, the HSI color space may be partitioned into categories or bins, such as described above with reference to FIGS. 7 and 8. The number of bins to divide the space into may utilize color sensitivity information received in step 270.

Figure 10:
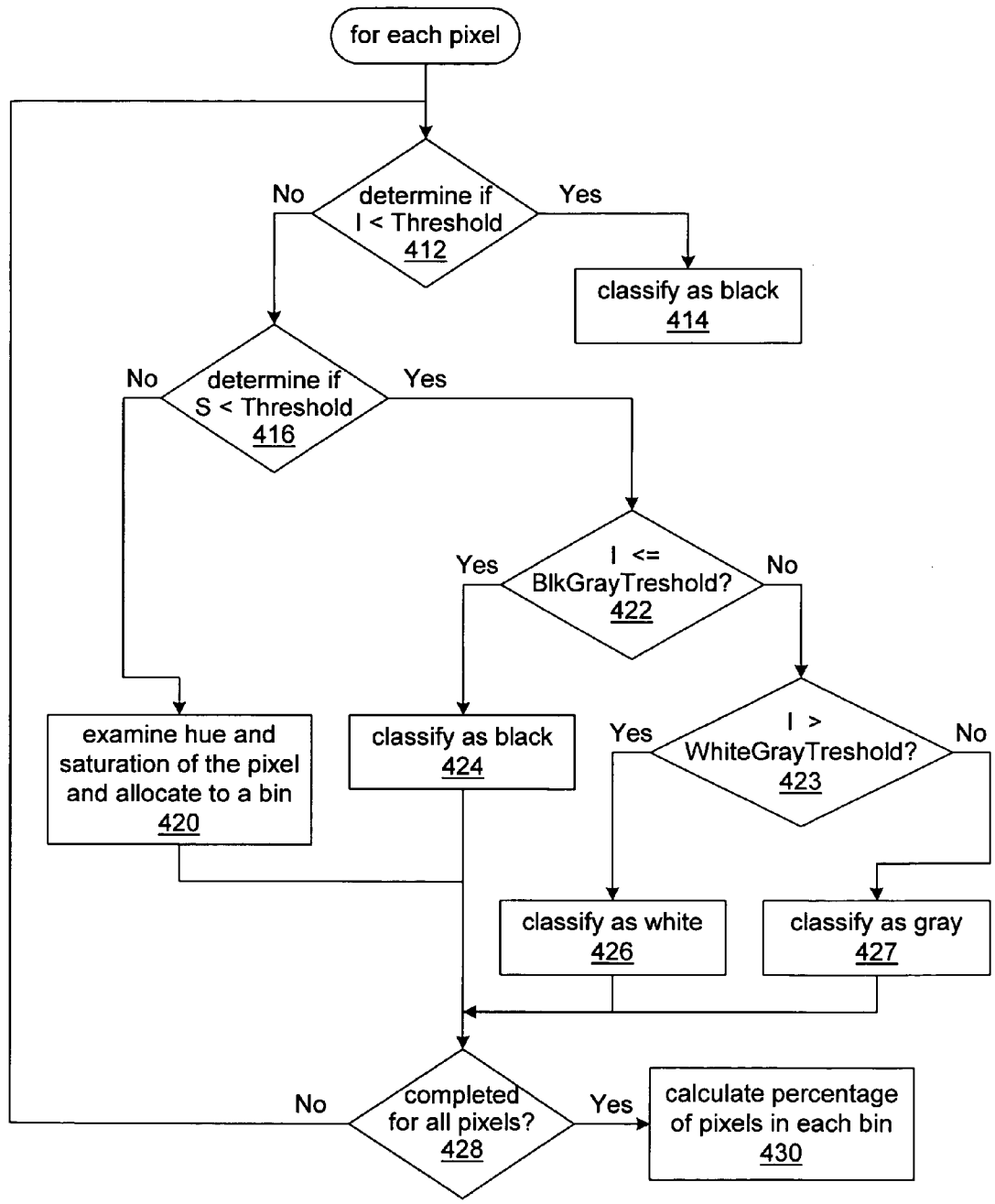
FIG. 10 is a flowchart diagram illustrating one embodiment of determining a distribution of image pixels among HSI color categories.

In step 276, the image may be analyzed pixel by pixel, in order to determine the pixel distribution among the HSI bins. FIG. 10 illustrates one embodiment of step 276 in detail. In one embodiment, the user may specify one or more colors which should be ignored in performing the pixel distribution. For example, the user may specify that black, gray, white or some combination of these or other HSI colors should be ignored. This may be useful, for example, if the template image and/or the target image have background colors that should be ignored for color matching purposes.

In one embodiment, pixels may be examined at the time that the HSI bin distribution is performed, so that pixels corresponding to certain bins are ignored. In another embodiment, this consideration may be performed after the pixel distribution is performed. For example, for each bin corresponding to a color that should be ignored, the number or percentage of pixels assigned to that bin may be set to zero after the distribution is performed, and the pixel percentages in the remaining bins may be normalized to sum to 100 percent. This latter embodiment may result in a more efficient color characterization method.

In the description above, each examined pixel is assigned to a single category or bin. In alternative embodiments, pixels may be assigned to multiple bins, e.g., on a weighted basis. For example, if a pixel falls near an "edge" of a bin, with respect to the portion of color space represented by that bin, then a fraction of that pixel's weight may be assigned to a neighboring bin. The determination on how to distribute a pixel among multiple bins may be performed in any of various ways, including through the use of a fuzzy membership function. It is noted that fractional distribution of pixels may decrease the efficiency of the color characterization method, but may still be desirable in certain cases. Fractional distribution of pixels is further discussed below.

In one embodiment the color characterization method may also involve determining one or more color categories which are characterized as dominant color categories of the image, as shown in step 278, wherein the one or more dominant color categories are assigned a relatively larger proportion of image pixels, with respect to other color categories of the color space.

The determination of dominant color categories may be performed in any of various ways. For example, in one embodiment the categories may be sorted with respect to pixel allocation percentage, and the category with the highest percentage may then be examined. If this percentage falls at or above a certain ratio value T, which may be a default value or may be specified by a user, then this color category may be considered as a single dominant color category for the image. If this percentage is below the value T, then the color category with the next largest percentage of pixel allocation may be considered as a second dominant color category for the image, etc., until the sum of the percentages of the examined bins is at or above the value T. Thus, there may be multiple dominant color categories for an image. In one embodiment it may be required that the percentage of pixels in the largest category be at least of a certain threshold value in order for the image to have any dominant color categories.

In the preferred embodiment, the dominant color information is determined only for the template image, i.e., this computation may be omitted when performing a color characterization analysis of a target image region. The dominant color information of a template image may be utilized when comparing the color information of the template image to the color information of a target image, as described below.

FIG. 10—HSI Bin Pixel Distribution

FIG. 10 is a flowchart diagram illustrating one embodiment of step 276 of FIG. 9, in which pixels of an image are assigned to appropriate HSI space bins. The method shown in FIG. 10 may be performed for each pixel of an image or for only a subset of the pixels. For the template image, the method would typically be performed for each pixel, in order to obtain as much color information for the template image as possible. The color characterization analysis for the template image may only need to be performed once, and may be performed "offline", i.e., does not need to be performed in real time as a target image is searched for color match regions. Thus, once the color characterization information has been obtained for the template image, it may not be necessary to have the template image in memory for a color match location procedure.

For each region of the target image that is searched, it may be desirable to examine only a subset of the region's pixels, since categorizing every pixel of the region into a bin may be computationally expensive, and many regions in the target image may need to be searched. In many cases, analyzing a subset of pixels in each target image region may be sufficient, e.g., in order to perform a coarse-grained search that identifies candidate color match regions that can then be analyzed in more detail, based on pattern information. The sample pixel subset may be generated using any of various sampling techniques, such as grid-based sampling, random sampling, low discrepancy sequences, or other non-uniform sampling.

In step 412 the method determines if the intensity value of the pixel is below a certain threshold, which could be specified by the user as some small value close to 0. FIG. 8B illustrates the intensity threshold 446. The intensity threshold 446 is preferably a decreasing function of the saturation. The intensity threshold 446 may be set by the computer or in some embodiments may be selected by the user. In one embodiment, on the assumption that hue, saturation and intensity values have been normalized to range from 0 to 255, the intensity threshold BlkThreshold is specified as a function of the saturation as shown below:

$$BlkThreshold = \begin{cases} 128 & \text{for } sat < 10 \\ (128-5)\exp[-0.025 \times (sat-10)] + 5 & \text{for } sat \le 10 \le 200 \\ 5 & \text{for } 200 < sat \end{cases}$$

If a pixel's intensity is smaller than BlkThreshold, then in step 414 the pixel is immediately categorized as black. In this case, no further color learning is performed on the pixel. The threshold comparison performed in step 412 saves computer cycles by not requiring further HSI analysis on a pixel that is black based strictly on its low intensity. If the intensity value of the pixel is above the intensity threshold of step 412, then operations proceed to step 416, and further color categorizations are applied.

In step 416 the saturation value of the pixel is examined. If the saturation of a pixel is very low, different colors are not distinguishable and the pixel may immediately be categorized as either black, gray, or white. When a pixel's saturation is close to the minimum saturation level, the pixel may be graphically represented near the origin of the circle of FIG. 8B. Step 416 determines if a pixel's saturation is lower than a selected saturation threshold 604 (FIG. 8B), i.e., is very close to 0. In one embodiment, the Saturation Threshold 604 has a default value of 10 on a scale from 0 to 255 (this corresponds to a default value of 0.04 on a scale from 0 to 1). If the saturation level of a pixel is below the saturation threshold, the pixel does not require further saturation analysis or the hue analysis of step 418 so the process advances to step 422.

In steps 422 and 423, a pixel (which has a very low saturation value) is examined based on its intensity value. A pixel that has very low saturation (i.e. is below the saturation threshold) is categorized as either black, gray, or white based on which half of the intensity plane the pixel resides in. In other words, the hue and saturation analysis of step 420 is not necessary because a pixel with a saturation value less than the saturation threshold is not distinguishable from other pixels with similar saturation values and different hue values. If the pixel is on the lower portion of the intensity plane, i.e., I<=BlkGrayThreshold, the pixel is categorized as black in step 424. Otherwise, the pixel is examined in step 423 to determine whether the intensity value falls on the upper portion of the intensity plane, i.e., I>WhiteGrayThreshold. If so, then the pixel is categorized as white in step 426. Otherwise, the pixel is categorized as gray in step 427. Values for BlkGrayThreshold and WhiteGrayThreshold may be pre-specified based on the importance of black, gray, and white color in the particular application. In one embodiment, the threshold values may be set to divide the intensity plane into three equal portions, which puts the same weight on black, gray, and white colors. After a pixel is categorized as either black, gray, or white, the method continues to step 428.

If the saturation of a pixel is more than the saturation threshold 604 in step 416, then hue and saturation analysis are performed in step 420. In step 420, the hue and saturation values of the pixels are analyzed, and the pixel is assigned to one of the bins in the hue/saturation plane based on these values.

As described above, FIG. 8A illustrates the hue/saturation plane, wherein hue is categorized by a color's angular orientation (from 0 to 360 degrees) on the cross sectional plane of FIG. 8A, and saturation is categorized as the color's radial distance on the cross sectional plane of FIG. 8A. Hue characterization may divide the hue plane into, for example, 7, 14, or 28 bins (for low, medium, or high complexity) depending on a selected color sensitivity, and the bins are further split in half by a radial distance value, represented by circle 442 (FIG. 8A), that allows categorization according to saturation within each hue bin. This doubles the total number of bins, or categories, in the hue/saturation plane to 14, 28, or 56, respectively.

If the current pixel being analyzed is the last pixel to be analyzed as determined in step 428, then operation completes. If not, then operation returns to step 412, and steps 412–428 are repeated. The color categorization process is repeated for at least a subset of the pixels, and possibly every pixel, until all are categorized. As each subsequent pixel is categorized, a running total of the number of pixels assigned to each bin may be stored in memory. Bins and the allocation of pixels to bins may be represented in any of various ways. In the preferred embodiment, the pixels are assigned to N categories or bins, where N=C*2+3 (where C=7, 14, or 28 depending on the selected complexity). The number N of bins or color categories may of course be adjusted by changing one or more of the number of hue divisions and saturation divisions.

After each pixel has been examined and assigned to one of the N categories, in step 430 the method may calculate color parameters, such as the percentage of pixels in each bin, i.e., the number of pixels in each bin in relation to the total number of pixels examined. These calculations will result in N percentages whose sum is equal to 100%. Percentages are used, rather than raw data, to allow matching of differently shaped, scaled and rotated images. It is noted that other types of color parameters may be generated, e.g., other types of normalized values which are independent of the number of pixels in the image object. The color characterization for the image thus may produce a list or data structure that contains N percentage values or parameters representing the color characterization of the image.

As noted above with reference to FIG. 9, in one embodiment, a user may specify one or more colors in the image to be ignored. In this case, the percentage of pixels in each bin corresponding to an ignored color may be set to zero, and the percentages for the remaining bins may be normalized to result in a total of 100%, or pixels corresponding to these bins may not be assigned to the bins at all, which would automatically result in a zero percentage for these bins.

Figure 11:
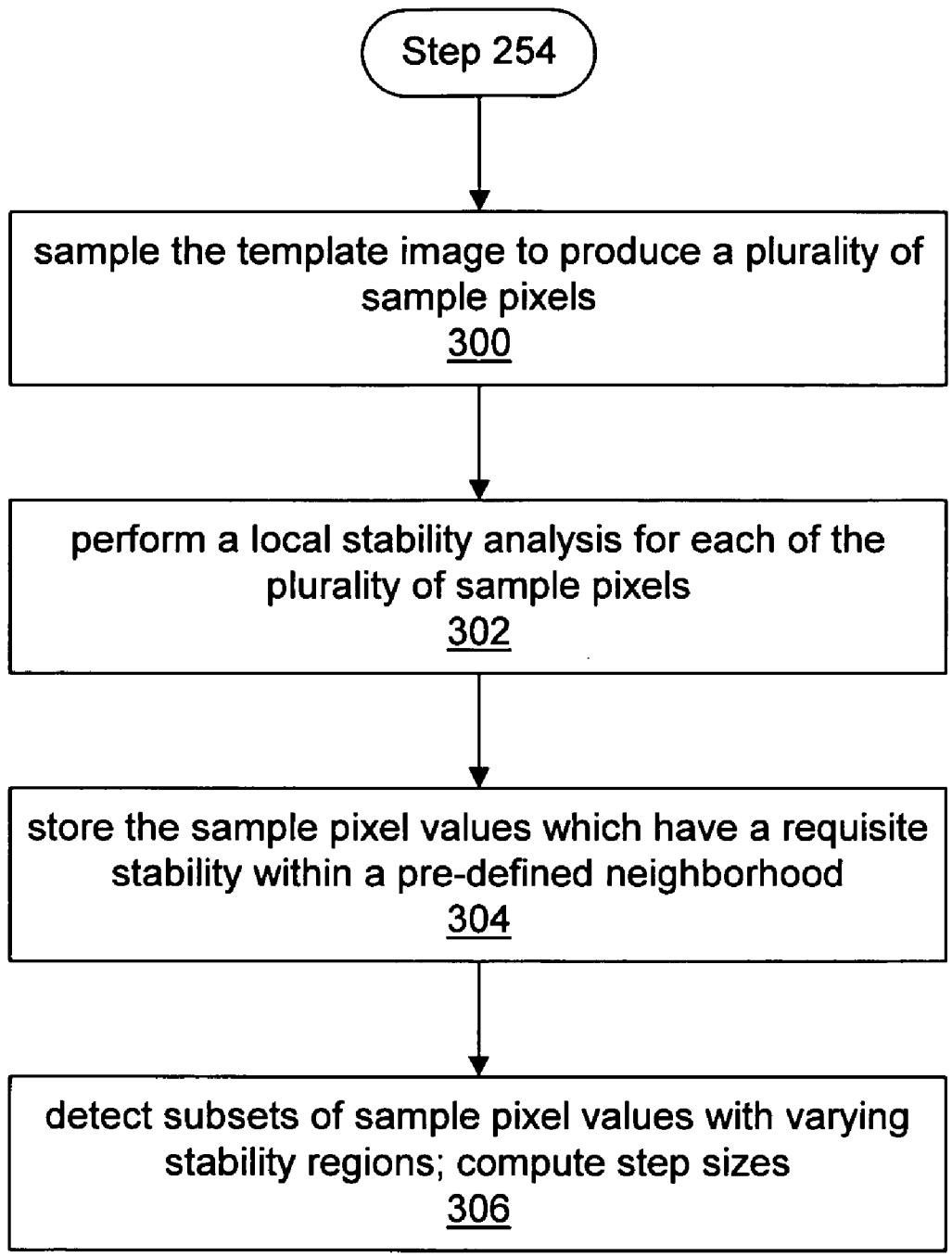
FIG. 11 is a flowchart diagram illustrating one embodiment of characterizing a template image with respect to pattern information.

FIG. 11—Characterizing Template Image Pattern Information

FIG. 11 is a flowchart diagram illustrating one embodiment of step 254 of FIG. 6, in which pattern information of a template image is characterized. In step 300 the template image is sampled to produce a plurality of sample pixels that accurately characterize the template image. The template image may be sampled on various component planes or color space planes, e.g., on the luminance (intensity) plane, saturation plane, and/or hue plane. The sample information for each of these planes may be used in various stages of the pattern-matching process. For example, in one embodiment, sample information from the luminance plane may be used during the initial pattern matching iterations, and sample information from all of the planes may be used to verify a final pattern match.

According to one embodiment, the pixels comprising the template image are sampled using a Low Discrepancy sequence. Low Discrepancy sequences comprise mathematical sequences that are efficient samples of high dimensional spaces. A Low Discrepancy sequence is also referred to as a quasi-random sequence or a sub-random sequence. The Low Discrepancy sequence is designed to produce sample points which maximally avoid each other, i.e., is designed to produce sample pixels which best represent the image. Examples of Low Discrepancy sequences include the Halton sequence, the Sobol sequence, the Faure sequence and the Niederreiter sequence, wherein differences between these are minor from a real world applications point of view. Sampling the template image using a Low Discrepancy sequence may result in much fewer sample pixels to characterize the template image and/or a better characterization of the template image than would a random sampling technique or a uniform sampling technique.

The following is an example of the operation of a Low Discrepancy sequence (Halton set).

First, at step 1 the method selects the type of Low Discrepancy sequence, e.g., Halton, 2d (2-dimensional). In general, mathematicians are interested in nd applications of low-discrepancy sets where n>10, sometimes n>100. However, for a 2-dimensional image, a 2d sequence is used.

At step 2 the method then selects a criteria for construction of the Halton set, for example, construction in the unit square $[0,1] \times [0,1]$, it being noted that the general case can be derived by a scaling operation.

At step 3 the method then selects two prime numbers p and q. It is very common to use p=2 and q=3, although this is not necessary. Every pair of (p,q) results in a slightly different Halton set, wherein all of these sets are equivalent.

The variables $(x_n, y_n)$ denote the nth element of the Halton set. Given n, at step 4 the method notates n in the p-ary system (in the case where p=2 it is the well-known binary system). The result is $n = a_k, \ldots a_1, a_0$ where the a's are 0 or 1 in case of the binary system, but $0, 1, \ldots, p-1$ in the general case.

At step 5, the method then reverses the order of $a_k, \ldots a_1, a_0$. This results in $a_0, a_1, \ldots, a_k$.

At step 6 the method then adds the (n-ary) point, i.e. $0.a_k \ldots a_2, a_0$. This number is in between 0 and 1 and represents the x-component of the nth Halton point $(x_n, y_n)$.

At step 7 the method repeats steps (4)–(6) based on the other number system q. This produces the y-component.

After steps 1–7, the nth point of the Halton sequence has been constructed.

The following is an example of the construction of a Low Discrepancy sequence in 2d. Here it is assumed that p=2 and q=3. This example determines the 10th element, i.e., $(x_{10}, y_{10})$.

The method starts with the x-component as follows:
(4') 10=1010 (decimal=binary) because 10=1*8+0*4+1*2+0*1
(5') reverse the order ->0101
(6') add the point $\to x_{10} = 0.0101$ (0.0101 can be translated into $0*(1/2)+1*(1/4)+0*(1/8)+1*(1/16) = 1/4+1/16 = 5/16$ Now the y-component is computed as follows:
(4") 10=101 (decimal=ternary) because 10=1*9+0*3+1*1
(5") reverse the order ->101
(6") add the point $\to y_{10} = 0.101$ (0.101 can be translated into $1*(1/3)+0*(1/9)+1*(1/27) = 10/27$ Once the points in the Low Discrepancy sequence have been determined, the points may be mapped to points in the template image, by scaling the values appropriately. These points in the template image may then be taken as sample points, e.g., during the pattern matching process, the grayscale pixel values at these points may be compared to corresponding grayscale pixel values in a region of the target image, for example by using a 2D correlation technique such as described above. The pattern matching may use a computed step size to step across the target image and/or use a coarse to fine search method for improved efficiency.

For more information on Low Discrepancy sequences, please see "Numerical Recipes in Fortran 77: The Art of Scientific Computing" (ISBN 0-521-43064-X) Cambridge University Press, pgs. 299–306, which is hereby incorporated by reference as though fully and completely set forth herein.

In one embodiment, no further steps may be performed in the pattern characterization method. However, in other embodiments, the plurality of sample pixels determined in step 300 may be processed further, as shown in steps 302–306. It is noted that step 300 may be performed in any of various other ways besides using Low Discrepancy sequences to produce the plurality of sample pixels, e.g., using a random sampling technique or a uniform sampling technique, such as a uniform grid-based sampling.

As shown in step 302, after the sampling of the image has been performed to produce a plurality of sample pixels, a local stability analysis may be performed for at least a subset of and preferably for all of the generated sample pixels to determine stability of the respective sample pixels to spatial perturbations. For each candidate sample pixel value for which this local analysis is performed, the method operates to determine a neighborhood around the respective candidate sample pixel where the template image pixel values comprised in the neighborhood correlate highly with the candidate sample pixel value. In other words, for each candidate sample pixel value for which the local stability analysis is performed, a correlation is performed with neighboring pixel values within the template image to determine if the candidate sample pixel value is stable within its neighborhood, i.e., the neighboring pixel values have similar or correlated values with the respective candidate sample pixel value.

In step 304 the method optionally operates to save only those candidate sample pixel values which have a requisite stability within a predetermined or predefined neighborhood size. Sample pixel values generated in step 300 which are not stable within the pre-defined neighborhood are preferably thrown out or not used. Thus, step 304 operates to further reduce the number of sample pixel values used in the pattern matching operation.

In one embodiment, after either of steps 302 or 304, in step 306 the method further operates to find or detect different respective stability regions or neighborhood sizes for which each of the respective subset or all of the sample pixel values are stable, according to a stability criteria or varying stability levels. Stated another way, the method operates to detect and categorize subsets of sample pixel values with varying stability regions, i.e., operates to categorize subsets of sample pixel values according to stability region size.

The different stability region sizes are also preferably used to determine a step size for stepping the respective sample pixels across a target image region in the pattern matching process, as described below. This step size is used during the pattern matching operation to reduce the number of correlations required to be performed in the pattern matching. Thus, for a set of sample pixel values which have a larger stability neighborhood size, the set of sample pixel values can be stepped across the target image during an iterative correlation process with a larger step size. A set of sample pixel values with a smaller stability neighborhood size is stepped across the target image during the iterative correlation process with a correspondingly smaller step size.

As described below, in the subsequent pattern matching process, the sample pixel values having different stability neighborhood sizes may then be used in a coarse to fine search, preferably using the respective computed step sizes. Thus the method operates to determine different stability neighborhood sizes and corresponding step sizes for use in a coarse to fine pattern matching search.

It is noted that the pattern characterization method described above may be extended to generate one or more sets of sample pixels that characterize the color information of the template image, rather than or in addition to, the pattern (grayscale) information. These pixels may then be used to sample color information in the target image, as described below. For example, each sample pixel in a set may have a color that is stable within a particular neighborhood size, and the sample pixels may be chosen to represent the most dominant colors of the template image, etc. This determination of sample color pixels may be performed together with the pattern analysis or may be performed as part of the color characterization method described above with reference to FIG. 9.

Figure 12:
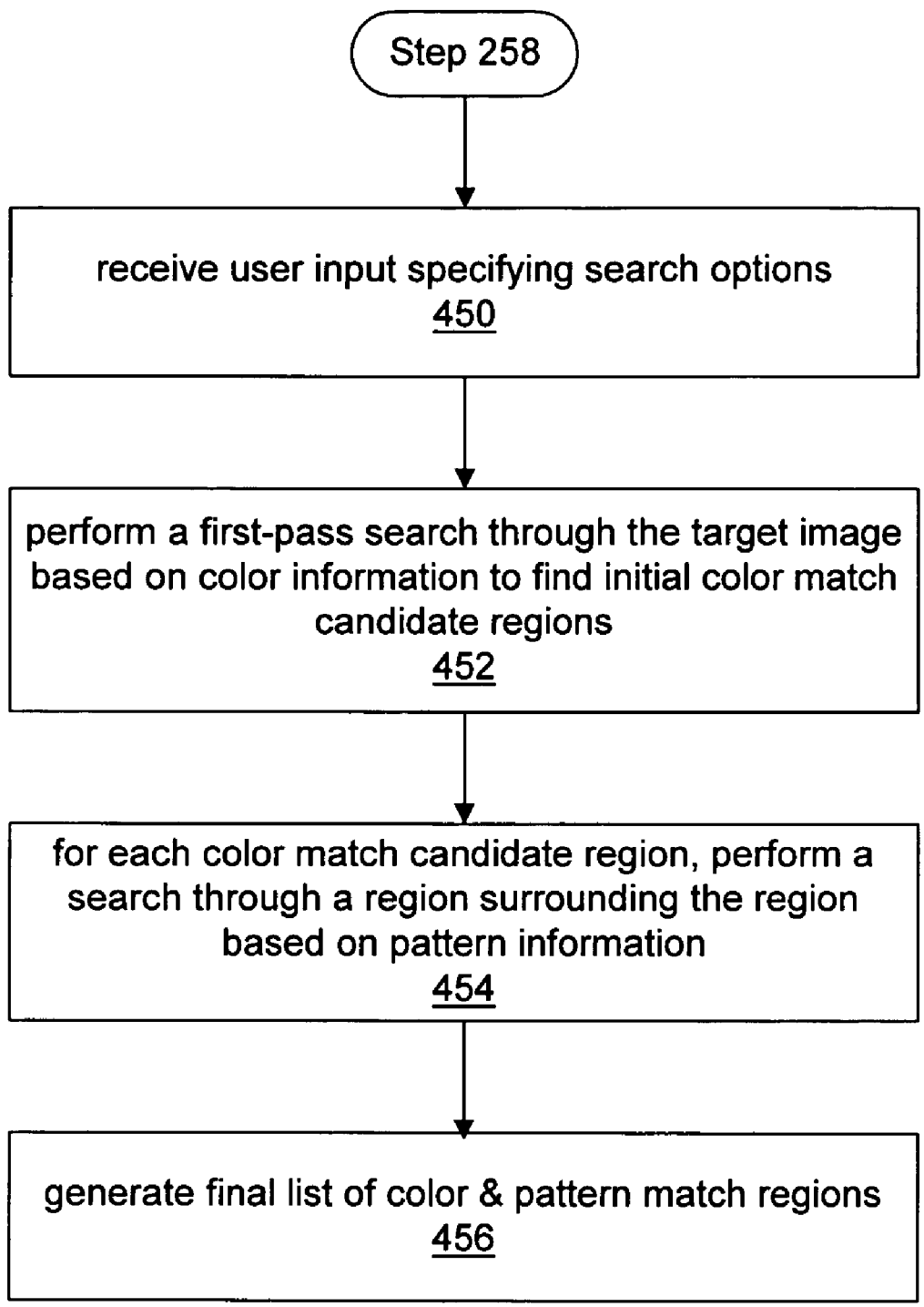
FIG. 12 is a flowchart diagram illustrating one embodiment of a method for performing a multi-pass search of a target image to find regions having color and pattern information that match a template image.
Figure 13A:
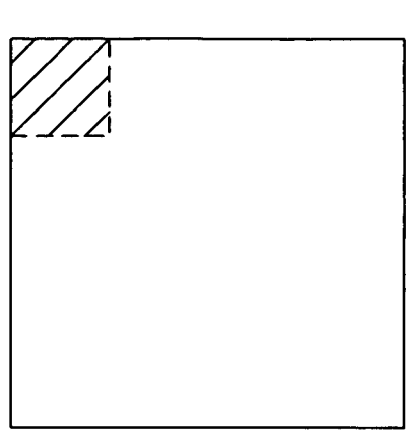
FIG. 13 illustrates an example of traversing a target image during a first-pass color match search.
Figure 13B:
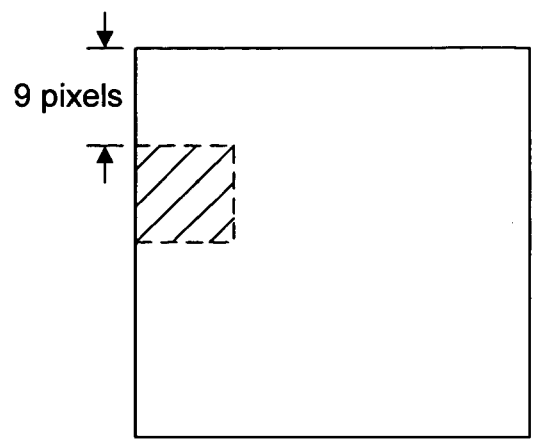
Figure 13C:
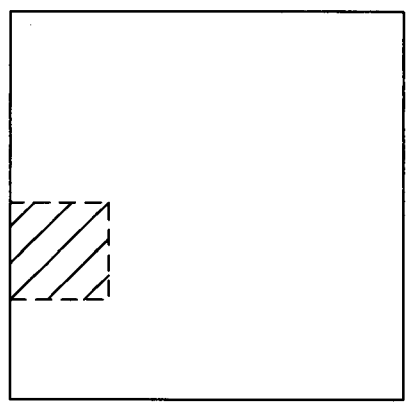
Figure 13D:
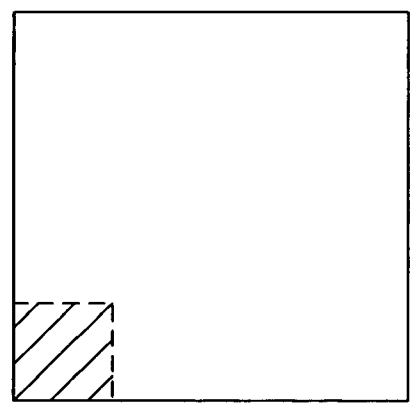
Figure 13E:
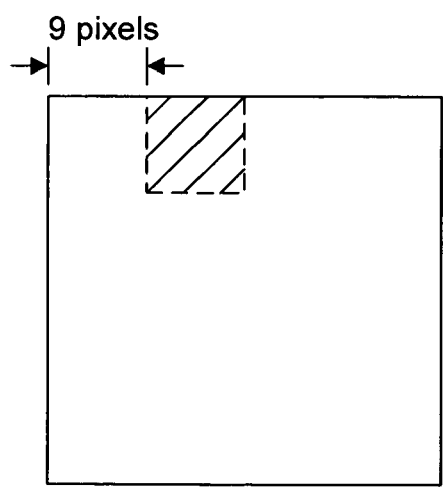
Figure 13F:
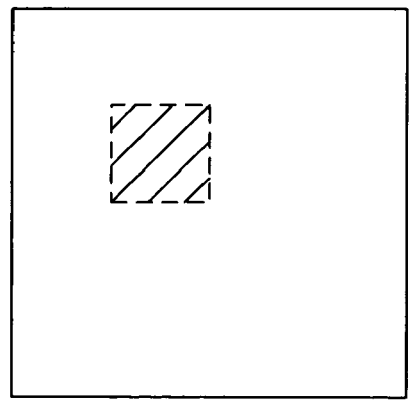

FIG. 12—Target Image Search

FIG. 12 is a flowchart diagram illustrating one embodiment of a method for searching a target image to find regions having color and pattern information that match a template image. The target image search method shown in FIG. 12 may be used in step 258 of the color and pattern match location method shown in FIG. 6. In alternative embodiments, any of various other search methods may be used, as desired for a particular application. The target image search method shown in FIG. 12 utilizes a multi-pass technique, in which candidate color match regions of the target image are identified in a first-pass color matching search, and pattern information in a larger region surrounding or proximal to each of these candidate color match regions is then examined in more detail in one or more subsequent pattern matching searches to identify final color and pattern match locations.

Each region of the target image that is examined during the first-pass color match search may be regarded as a window into the target image. This window may have various sizes. For example, the window size may correspond exactly to the size of the template image, or the window size may be scaled to be larger or smaller than the template size. The window may be moved through the target image in order to sample the color information of the image at various regions. The regions at which to sample the color information may be determined in any of various ways. For example, in one embodiment, the window may initially be positioned at the top, left corner of the target image and may then be moved through the image at interval steps. For each sample region, the color information of the region may be compared with the color information of the template image, as described below.

FIG. 13 illustrates an example of window movement during a first-pass color match search, in which the window begins at the top, left corner of the target image and is moved through the target image using a step size of nine pixels. After an initial color comparison between the template image and the top, left portion of the target image has been performed in FIG. 13A, the window, for example, is moved downward 9 pixel scan lines as shown in FIG. 13B. After this portion of the target image is compared to the template image, the window is moved another 9 scan lines downward as shown in FIG. 13C. The comparisons are repeated until the window reaches the bottom left portion of the target image, as shown in FIG. 13D. After this comparison, the window, for example, is moved back to the top of the target image and is moved over 9 vertical pixel columns to perform another comparison, as shown in FIG. 13E. After this comparison is performed in FIG. 13E, the window is moved down 9 horizontal scan lines of pixels as shown in FIG. 13F. This procedure again repeats a plurality of times until the window again reaches the bottom of the target image. At this point, the window is moved back to the top of the target image and across 9 more vertical columns of pixels (not shown) to perform another set of comparisons. This procedure may be performed until the window has been stepped through the entire target image, using a 9 pixel step size.

It is noted that FIGS. 13A–13F are merely an example of stepping the window across the target image, it being noted that the window may be stepped across the target image using any of various step sizes and in any of various manners, e.g., left to right, right to left, top to bottom, bottom to top, or other methodologies. Also, the target image may not necessarily be sampled at regular step intervals. For example, window placement may be chosen using any of various algorithms, or may be chosen randomly, quasi-randomly, etc.

In step 450 of FIG. 12, user input specifying various search options may be received. For example, the search options may specify various parameter values affecting the degree of granularity used for deciding color or pattern matches and/or the efficiency of the target image search process. In one embodiment, the user may specify one of three options: "conservative", "balanced," or "aggressive," which each control various search parameters, such as described below with reference to FIG. 26. In other embodiments search parameters may be specified individually.

In step 452, a first-pass search through the target image may be performed in order to find initial color match candidate regions, i.e., regions that match, at least to a degree, the color information of the template image. One embodiment of step 452 is described below with reference to FIG. 16.

In the first-pass color matching search, color information of various regions of the target image may be sampled at a relatively large step size, in order to efficiently identify areas of the target image containing a possible match. In step 454, a larger region surrounding or proximal to each color match candidate region identified in step 452 may be examined in more detail, with respect to pattern information. The size of each region to be searched in step 454 may be dependent on various factors, such as the template image size, the degree to which the respective candidate color match region was determined to match the template image in color, etc. Particular embodiments of step 454 are discussed in detail below.

In step 458 a final list of color and pattern match regions may be generated from a list of candidate regions determined in step 454. The final list may be based on a measure of how well each candidate matches the template image with respect to color and/or pattern information, e.g., as compared to threshold values which may be specified by the user.

Figure 14:
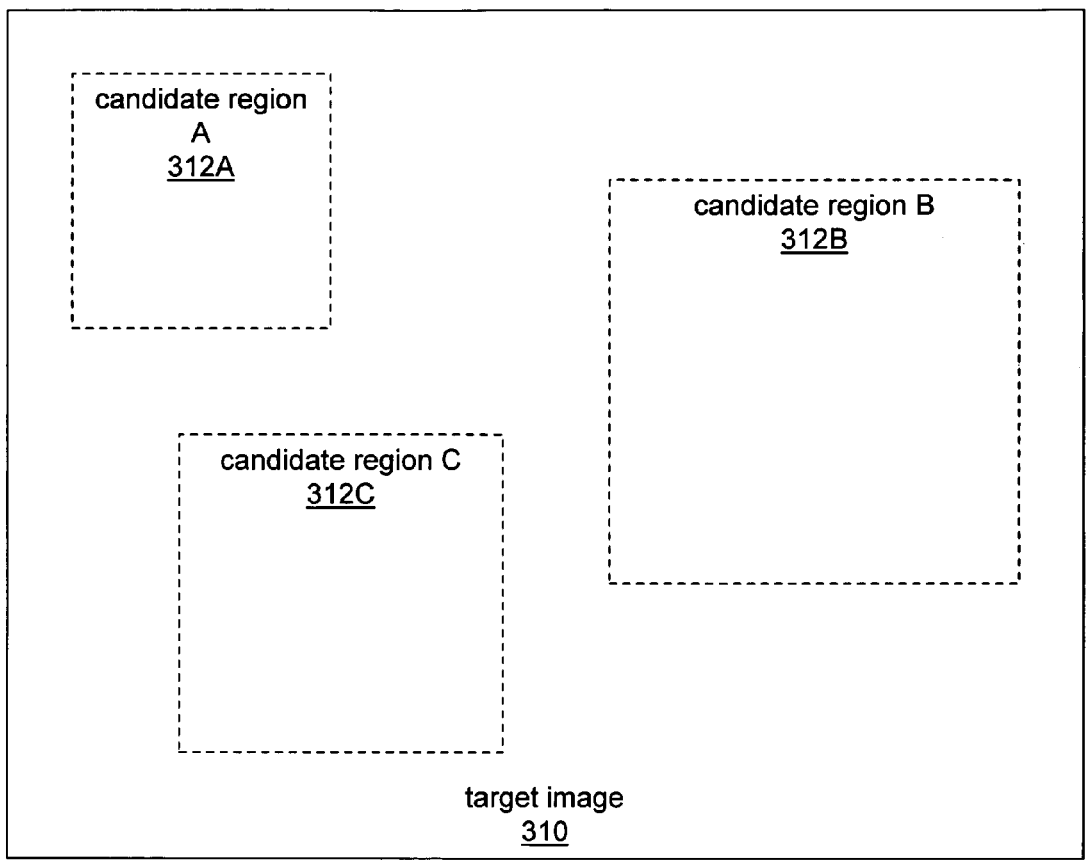
FIG. 14 illustrates a target image and several regions surrounding color match candidate regions determined in response to a first-pass color matching search.
Figure 15:
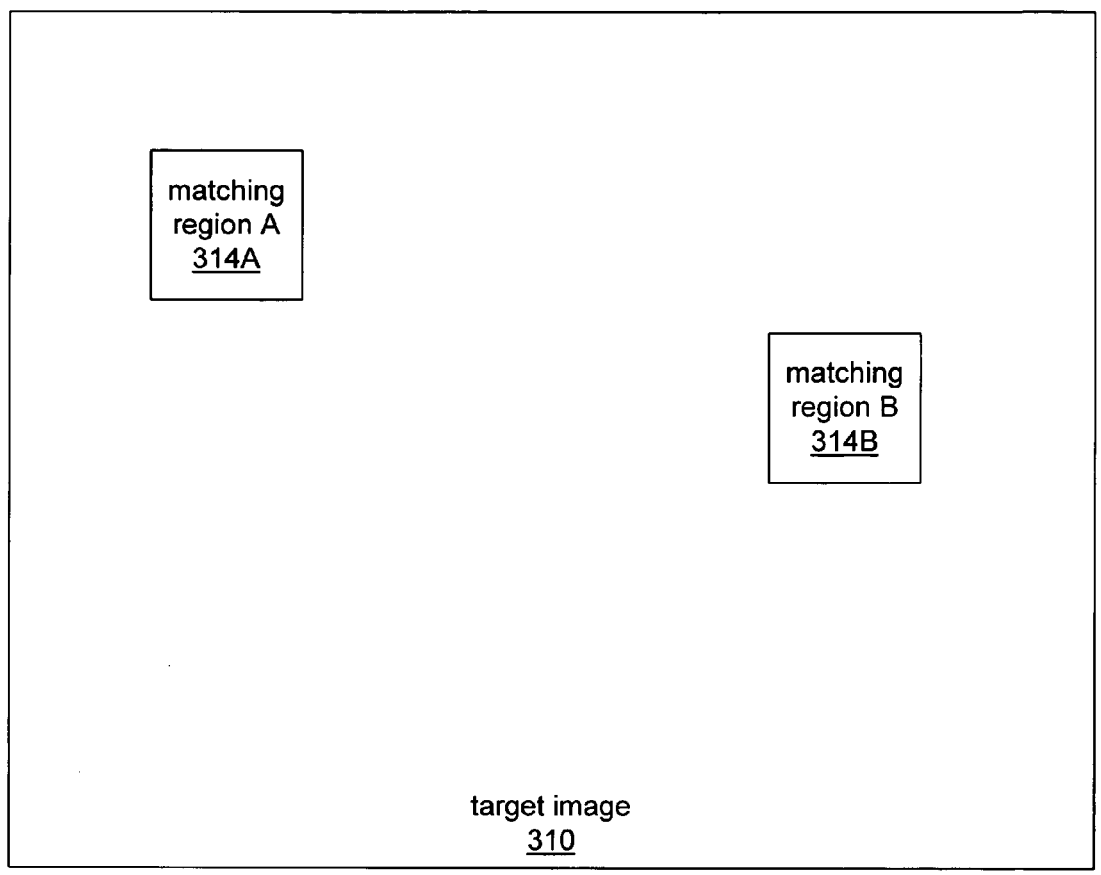
FIG. 15 illustrates the target image of FIG. 14 and final matching regions found based on pattern matching within the regions shown in FIG. 14.

FIGS. 14–15: Example Search

FIGS. 14 and 15 illustrate an example of the multi-pass search process discussed above with reference to FIG. 12. FIG. 14 illustrates a target image 310 and several regions within the target image labeled as "candidate regions" 312.

Each candidate region is intended to illustrate a larger region that surrounds a candidate color match region determined in the first-pass color match search (step 452 of FIG. 12). As shown, candidate regions 312A, 312B, and 312C are of different sizes. As noted above, the size of a region surrounding a color-match candidate region may depend on factors such as how well the color-match candidate region matched the template image with respect to color.

FIG. 15 illustrates the same target image 310 and final matching regions 314, which were found within the candidate regions 312, based on pattern matching. In other words, the matching regions 314 are the final matching regions determined after steps 454 and 456 of FIG. 12 have been performed. In this example, no region within candidate region 312C was determined to match the pattern information of the template image. Thus, only two final matching regions are shown.

Figure 16:
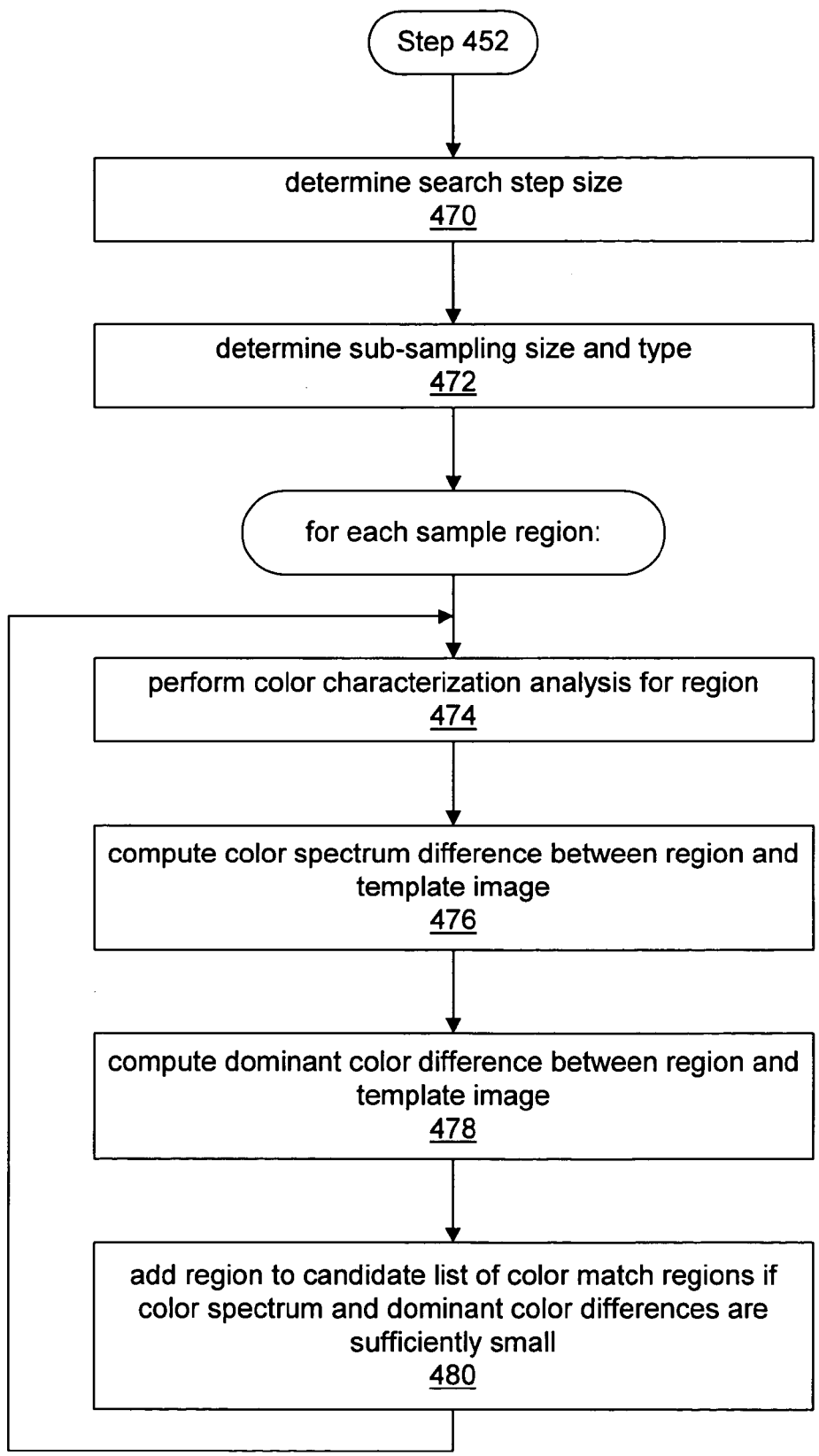
FIG. 16 is a flowchart diagram illustrating one embodiment of a method for performing a first-pass color matching search in a target image.

FIG. 16—First-Pass Search

FIG. 16 is a flowchart diagram illustrating one embodiment of a method to perform the first-pass color matching search illustrated in step 452 of FIG. 12. As discussed above, in one embodiment, the first-pass search may involve sampling color information at various regions of the target image, where the locations that are sampled may be determined by a window that slides along the target image according to a particular step size. Thus, in step 470 the method may determine an appropriate step size to use in sliding the window. The step size may at least in part be determined based on user input received in step 450 of FIG. 12. For example, if the user specified aggressive search criteria, then the step size may be relatively large, whereas the step size may be relatively small if the user specified conservative search criteria. In various embodiments, the search size may also depend on the size of the template image and/or the target image.

For each region that is sampled, the color information for the region may be analyzed, similarly as for the template image. However, as described above, it may not be desirable to examine the color information of every pixel in the region. Thus, in step 472, a sub-sampling size may be determined, wherein the sub-sampling size specifies the number of pixels to examine for each location. Similarly as for the step size, the sub-sampling size may depend on search criteria specified by the user.

In step 472, a sub-sampling type may also be determined. The sub-sample pixels may be determined in any of various ways, including grid-based or other uniform techniques, random techniques, via a low discrepancy sequence, etc. The sub-sampling type may control the determination of the sub-sample pixels. In one embodiment, the pixels used to sample the color information at each location may correspond to the sample pattern-matching pixels determined in the pattern analysis discussed above with reference to FIG. 11. As noted above, these sample pixels may be determined in the pattern analysis to efficiently characterize both the pattern information and the color information of the template image with a relatively small number of points. Thus, using these sample pixels may increase the efficiency of the first-pass color matching search.

As shown in FIG. 16, steps 474 through 480 may then be performed for each region of the target image to be sampled.

In step 474, a color characterization analysis for the target image region may be performed. This step may utilize the color characterization method described above with reference to FIG. 9, in which the target image pixels (or subset of pixels) are examined individually with respect to their color information and assigned to color space bins.

In step 476, a measure of difference (or similarity) between the color spectrum of the target image region and the color spectrum of the template image may be computed by comparing the information obtained in their respective color characterization analyses. This comparison may be performed in any of various ways. In one embodiment, for each color bin from a set of N bins, the pixel percentage values assigned to corresponding bins for the two images may be subtracted from one another, resulting in N difference values. The closer each of the difference values is to zero, the more similarity there is between the template image and the target image region, with respect to that color category; i.e., the percentage of pixels on the template image and the target image region that fall into that particular color category are substantially the same.

The absolute values of the difference values may then be summed to give a value falling between zero and two, where two represents a maximum measure of difference between the color spectrums and zero represents a maximum measure of similarity. Alternatively, each of the difference values may be compared to a threshold value to determine a "score" for each color category.

While the above method is simple to apply and the results are easily understood, this method may not be the best method for all color matching applications. For example, consider a case where at least one of the seven natural colors of the hue plane is divided into two or more bins, e.g., in response to a user specifying a medium or high sensitivity level. Even if the template image and the target image region have colors that are very similar, it is still possible that pixels from each will be assigned to different bins corresponding to the same natural color in the hue plane. Thus, the results from this example may show very few or no pixels in the same bin, i.e., the results would indicate that the template image and the target image region have very different color spectrums. This may not be the proper result because the colors in the template image and the target image region are actually very similar, but happen to be in different hue categories of the same natural color. Alternative color spectrum techniques which compensate for cases such as these are discussed below with reference to FIGS. 23–25.

As noted above, in one embodiment, information indicating one or more dominant color categories may be obtained when performing a color characterization analysis of a template image. Referring again to FIG. 16, in step 478, a measure of difference for the dominant color categories may be computed. This measure of difference may be computed similarly as described above for the color spectrum difference. For example, for each dominant color category determined for the template image, the percentage of template image pixels assigned to the dominant color category may be compared to the percentage of target image region pixels assigned to that color category.

In step 480, the difference values determined in steps 476 and 478 may be used to decide whether to add the region to a list of candidate color match regions. For example, the color spectrum difference may need to be less than a threshold value in order for the region to be added to the list. It is noted that the color spectrum difference may be tested immediately after its calculation, and further analysis of the sample region, such as step 478, may be aborted if the difference is too great.

If the color spectrum difference is sufficiently small, then the dominant color difference(s) may be considered. Considering the dominant color difference(s) may help to further ensure that the sample region matches the template image in color, since in various embodiments of the calculation of the color spectrum difference, it is possible to obtain a small difference value, even though the occurence of the dominant color(s) of the template image may be largely reduced in the sample region or may even be missing altogether in the sample region. Dominant color differences may be considered individually or together. For example, if there are multiple dominant color categories, then the percentage difference for each category may be required to be smaller than a threshold value in order for the region to be added to the candidate list, or the average of the differences for all the categories may be required to be smaller than a threshold value.

Figure 17:
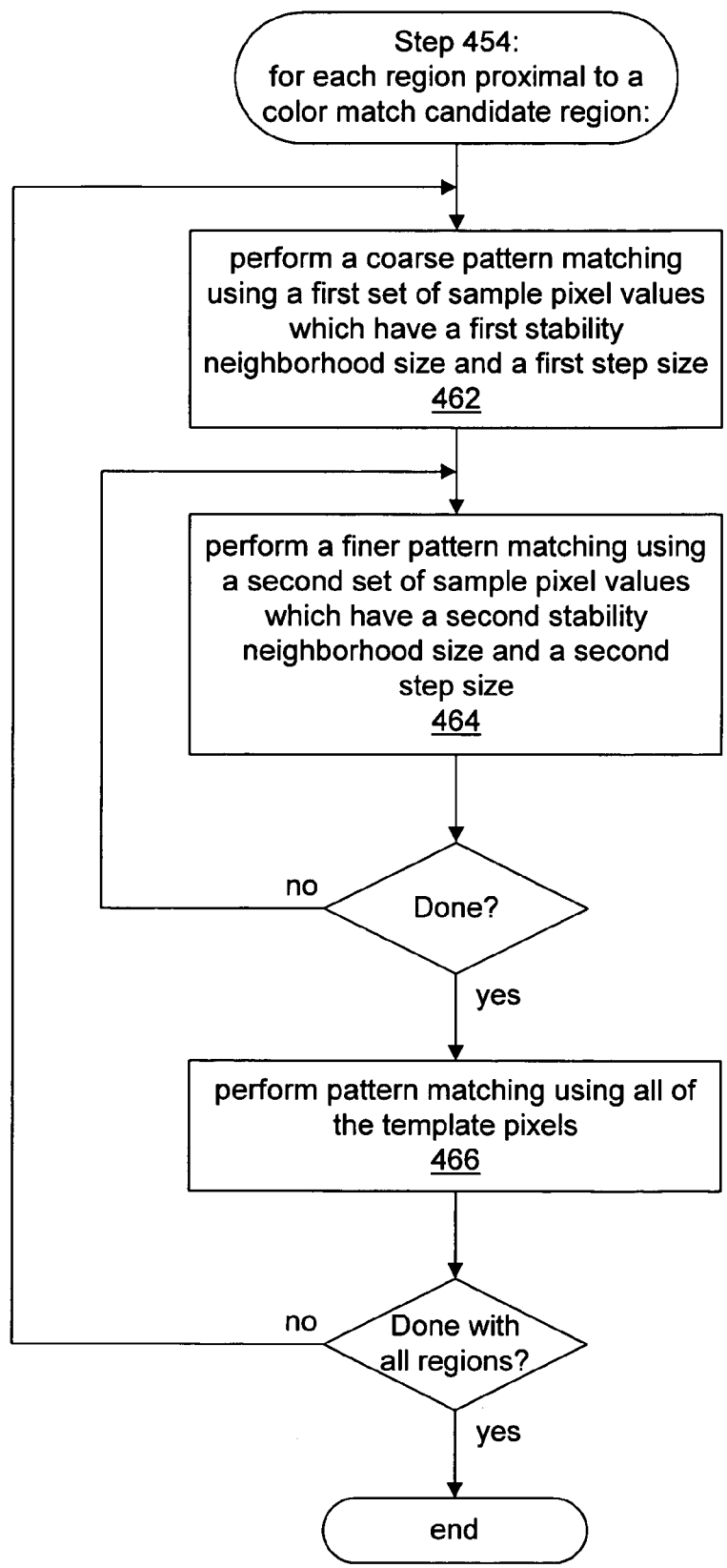
FIG. 17 is a flowchart diagram illustrating one embodiment of a pattern matching search performed in proximal regions surrounding color match candidate locations determined in a first-pass color matching search.
Figure 18A:
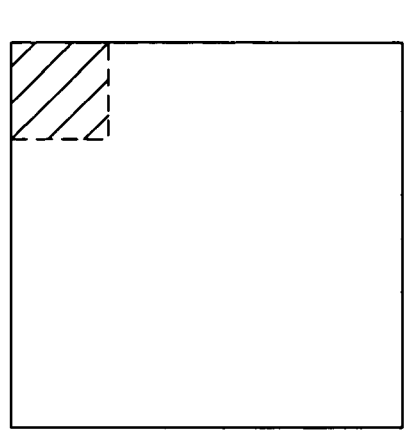
FIG. 18 illustrates an example of traversing a target image region during a pattern matching search.
Figure 18B:
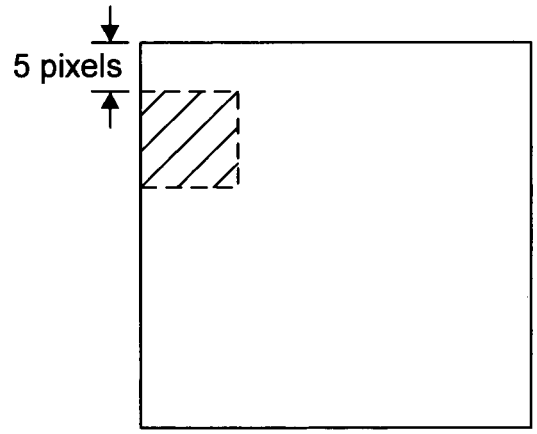
Figure 18C:
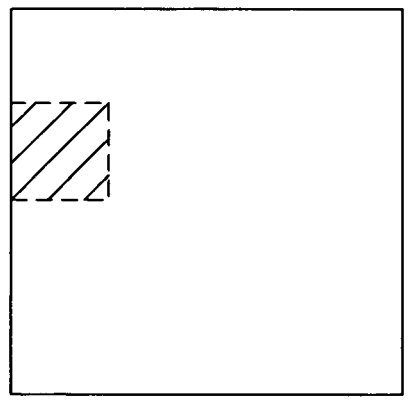
Figure 18D:
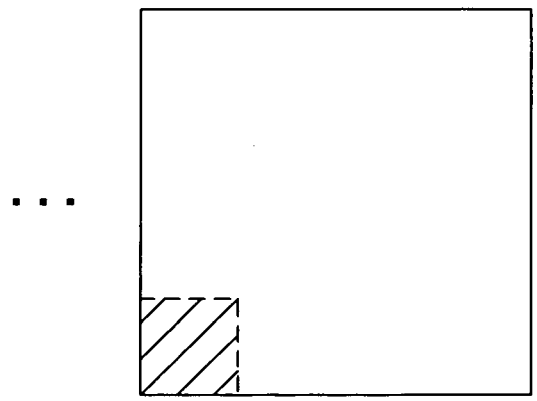
Figure 18E:
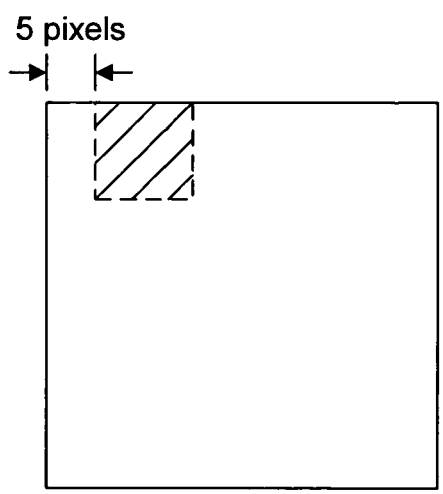
Figure 18F:
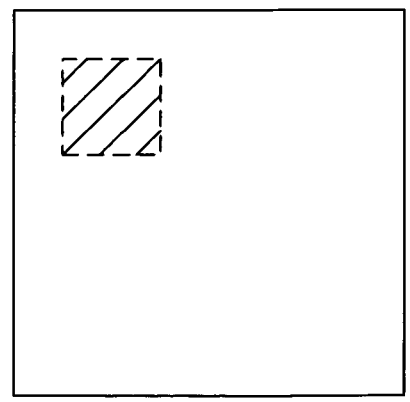

FIG. 17—Pattern Matching Method

FIG. 17 is a flowchart diagram illustrating one embodiment of the pattern matching search performed for each proximal region surrounding a color match candidate region, as shown in step 454 of FIG. 12. Various types of pattern matching may be used, as desired. The flowchart of FIG. 17 illustrates pattern matching using different stability neighborhood sizes and corresponding step sizes in a coarse-to-fine search.

Figure 26:
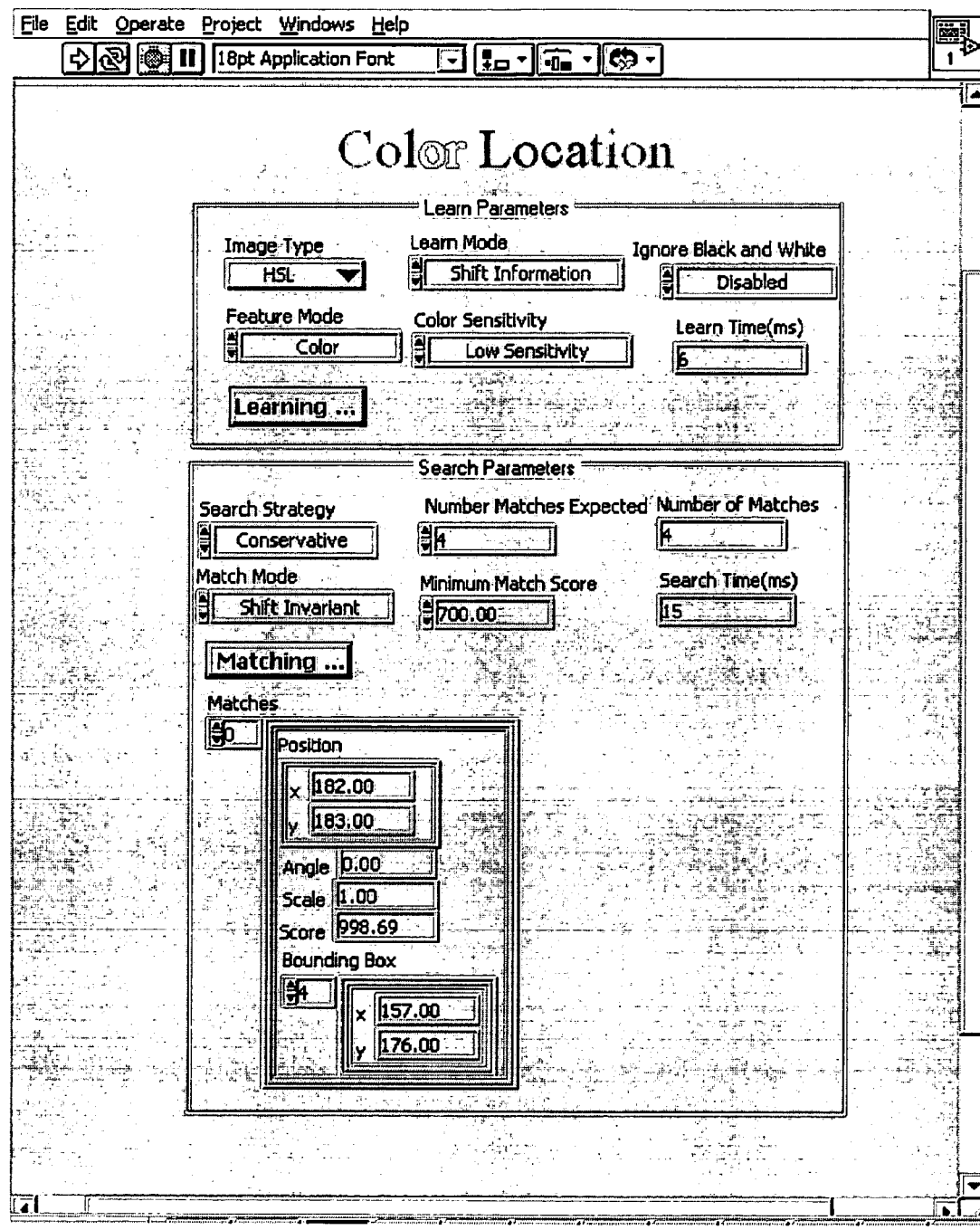
FIG. 26 illustrates an example of a graphical user interface (GUI) associated with color and pattern match location software according to one embodiment of the present invention.

In one embodiment, information regarding an expected number of matches to be found in the target image may be utilized in order to more quickly complete the color and pattern matching process. For example, FIG. 26 illustrates a graphical user interface enabling a user to specify an expected number of matches. In this case, the pattern matching method may limit the number of regions that are searched with respect to pattern information, based on a maximum number which may be calculated with a formula such as:

Max=Base+Factor*NumberExpected where "Base" and "Factor" are configurable variables.

The first-pass search based on color information may determine a large number of candidate color match regions, especially if the first-pass search is configured to use somewhat loose color matching criteria. The pattern matching process may limit the number of regions that are searched, based on the maximum number described above. For example, as discussed above with reference to FIG. 16, a measure of difference regarding how well the color information of each target image region matches the color information of the template image may be calculated. The color match candidate regions may be scored and sorted based on the color differences, and pattern matching may be performed in this sorted order, i.e., those regions surrounding color match candidate regions that match the color information of the template image most closely are searched first with respect to pattern information. As each region is searched, if a pattern match candidate region is found in that region, then the match may be added to a running total of color & pattern match candidates so far. If the number of color & pattern match candidates so far exceeds the maximum number, then the pattern matching may not be performed for the remaining color match candidate proximal regions. In one embodiment, however, if the color difference for a given candidate color match region is smaller than a certain threshold value, then the region surrounding that candidate color match region may be searched with respect to pattern information regardless of whether or not the maximum number of matehes has already been found.

As shown, in step 462 the method operates to perform a coarse pattern matching using a first set of sample pixel values which have a first stability neighborhood size and a corresponding first step size. Thus the method performs a first iteration of pattern matching using the first set of sample pixel values and the first step size. The target image region may be stepped through and the pattern information at various locations within the region may be sampled, similarly as described above for the first-pass color matching process. The first set of sample pixels used for the initial coarse pattern matching preferably have the largest stability neighborhood size and hence the largest step size. This coarse pattern matching produces zero or more possible regions for the template image in the target image region. In other words, this coarse pattern searching produces zero or more candidate regions in the target image region which possibly match the template image with respect to both color and pattern information. If desired, i.e., if the target image region is sufficiently small, then the number of candidate regions determined in step 462 may be limited to 1, e.g., by selecting the best match as the candidate.

As described above, sample pixel values may be obtained from various color planes of the template image, including from the hue plane, saturation plane, and/or the luminance plane. Sample pixel values from any or all of these planes may be used in step 462. In the preferred embodiment, sample pixel values from the luminance plane are used in step 462, and sample pixel values from other planes may be used in subsequent pattern matching iterations.

In step 464 the method operates to perform a finer pattern matching at the candidate regions determined in step 462, using a second set of sample pixel values which have a second stability neighborhood size and a corresponding second step size, wherein the second stability neighborhood size and the second step size are smaller than the first stability neighborhood size and first step size. This finer pattern searching produces zero or more possible match regions for the template image in the target image, and typically involves discarding one or more false matches produced in the coarse search performed in step 462.

Step 464 may be repeated one or more times to perform even finer pattern matching using other sets of sample pixel values which have even smaller stability neighborhood sizes and corresponding second step sizes. Step 464 is preferably repeated at the remaining candidate regions. After one or more iterations of step 464, the method may involve performing a final pattern matching in step 464 using all of the sample pixel values to determine if any remaining possible matches are actual matches. Alternatively, after one or more iterations of step 464 and/or after a pattern matching step using all of the sample pixel values, in step 466 the method further optionally performs a pattern matching using all of the template pixels for the remaining candidate regions in the target image region. The number of iterations that are performed in step 464 depends on the degree of desired preciseness in the pattern matching. In a similar manner, the decision whether step 466 is performed also depends on the degree of desired preciseness in the pattern matching.

Thus the pattern matching within each region comprises performing a plurality of iterations of pattern matching using different ones of the sets of sample pixels, preferably with different step sizes. Where the local stability analysis determines a plurality of sets of sample pixels with differing stability neighborhood sizes, the pattern matching comprises performing a plurality of iterations of pattern matching using different ones of said sets of sample pixels in a coarse to fine manner, e.g., with successively smaller stability neighborhood sizes and/or successively smaller step sizes. If a first iteration of pattern matching determines one or more candidate regions in the target image region which possibly match the template image, then one or more second iterations of pattern matching are performed at the determined one or more candidate regions in the target image region. The first iteration of pattern matching utilizes a first stability neighborhood size and a first step size, and each of the one or more second iterations of pattern matching preferably utilize a smaller stability neighborhood size and a smaller step size.

It is noted that the pattern matching iterations may also be alternated with iterations of color matching, if desired. For example, color matching iterations using a smaller step size and/or a larger sub-sampling size than used in the first-pass color matching search may be performed. In one embodiment, a color matching method may be performed on final matches as determined by the pattern matching iterations, to verify the final matches.

As an example of the operation of the pattern matching performed, assume that in step 306 of FIG. 11 a first set of sample pixel values which have a 9×9 stability neighborhood size and a second set of sample pixel values with a 5×5 stability neighborhood size, etc., are determined. When performing the pattern matching search in step 462, the method preferably starts using the sample pixel values which have the larger stability neighborhood size, e.g., the 9×9 stability neighborhood size. This search also uses a step size corresponding to this stability neighborhood size, e.g., a step size of 9 pixels. Thus, because these points or sample pixel values are stable over a 9×9 region, the search process is performed whereby, instead of visiting each pixel in the target image region to compute the match values, the pattern matching is preferably performed at a step size of every 9 pixels.

Once this initial core search determines an initial set of possible matches in the region, the second set of sample pixel values with a smaller neighborhood size, e.g., with the 5×5 stability regions, are used to perform a pattern matching at these initial match locations to perform a more refined search of these locations. This coarse to fine search based on stability neighborhood size and step size may be performed for a plurality of coarse to fine iterations until a desired degree of pattern matching has been accomplished.

FIG. 18—Pattern Matching Search Using a 5 Pixel Step Size

When performing a pattern matching search in a target image region, the region may be traversed in any of various ways. FIG. 18 illustrates an example in which the pattern matching is performed using a step size of 5 pixels, i.e., the template image is stepped across respective portions of the target image with a 5 pixel step size. FIG. 18 may represent an initial pattern matching traversal through a region proximal to a candidate color match region, or may represent a finer search through a sub-region determined in a previous pattern matching iteration. As discussed above, finer pattern matching searches may be repeated zero or more times, each iteration preferably with a smaller step size and a greater number of samples, until a desired degree of precision has been obtained. A final pattern matching iteration may involve using all pixels in the template image at the one or more regions in the target image region which are possible matches.

It is noted that performing pattern matching using a step size is a prior art technique. However, prior art methods generally use the same sample pixels or template image regardless of step size. Therefore, in the preferred embodiment of the present invention, the method operates to select a subset of sample pixels for a respective pattern matching comparison based on a local stability analysis. The method of the present invention also operates to compute a step size based on a determined stability region or neighborhood of the respective sample pixels. The method further operates to use different subsets of sample pixels and different corresponding step sizes in a coarse to fine analysis.

Figure 19:
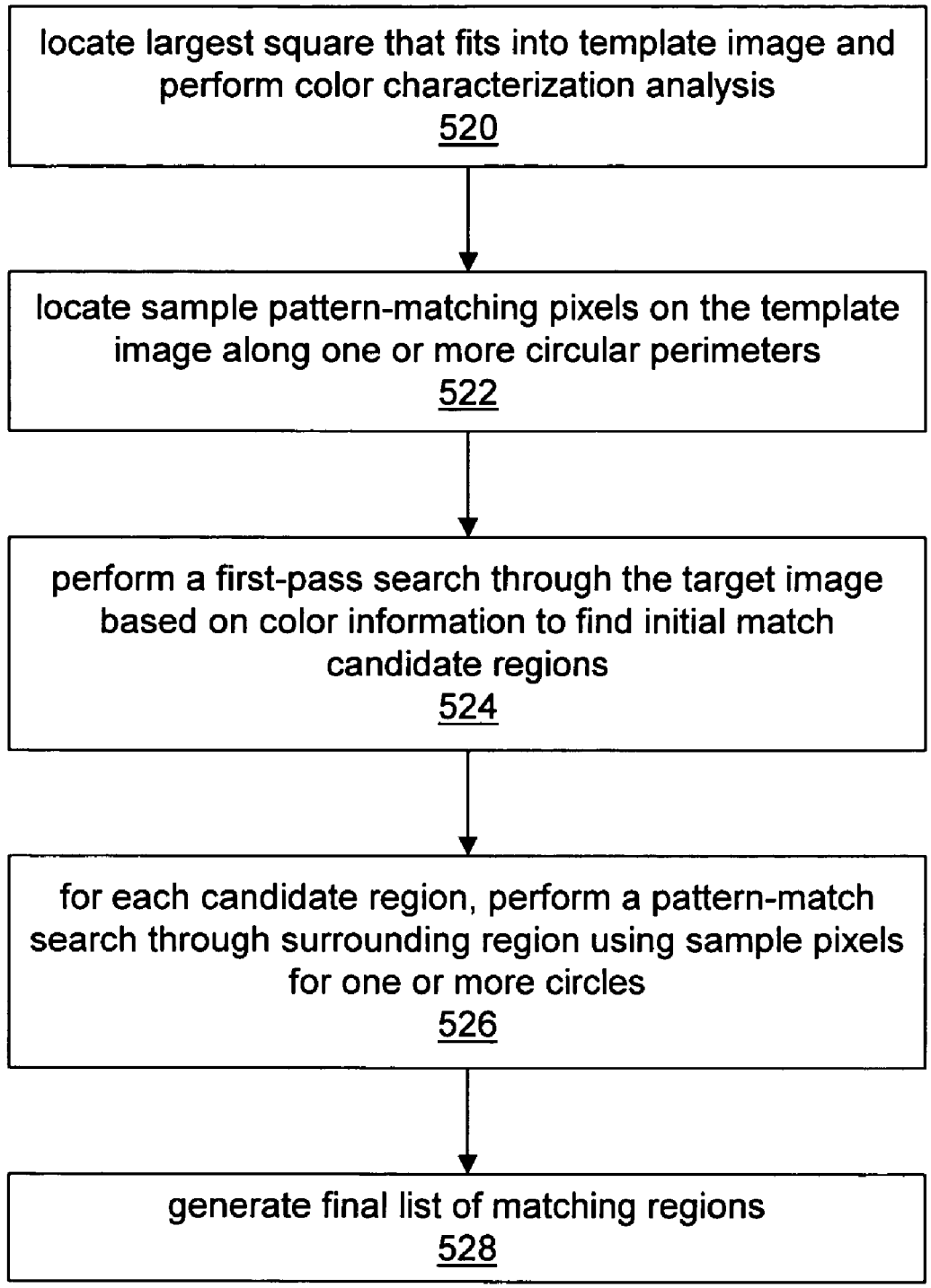
FIG. 19 is a flowchart diagram illustrating one embodiment of a method for performing rotation invariant color and pattern matching.

FIG. 19—Rotation Invariant Color and Pattern Matching

FIG. 19 is a flowchart diagram illustrating a method for performing rotation invariant color and pattern matching. The steps shown in FIG. 19 are similar to those shown in FIG. 6, but refer specifically to rotation invariant color and pattern matching. The method of FIG. 19 includes characterizing or representing the template image for rotation invariant matching. Thus, in FIG. 19 the objective is to sample the template image to find color information and a reduced set of sample pixel values or points that characterize the template accurately, and which are also conducive for finding the template image pattern in the target image irrespective of the orientation of the template image pattern in the target image.

The template image may have various shapes. To perform rotation invariant color and pattern matching, it would be ideal to consider the color information of the largest circle falling within the template image. However, this would then mean repeatedly sampling the color information of circular regions within the target image during the first-pass color matching search, which may be computationally expensive, and thus may be undesirable for real-time applications. Thus, as shown in step 520, in the preferred embodiment, the color information of a square region of the template image is characterized, such as the square bounding the largest circle that fits within the template image. This may result in analyzing color information near the corners of the square that is not rotationally invariant, but the increase in the search efficiency may outweigh this factor. In another embodiment, the color information of the largest square fitting within the largest circle may be analyzed. In this case, some of the rotationally invariant color information may not be analyzed, but no color information that is not rotationally invariant will be analyzed, and the search efficiency will still be increased.

In step 522 the method operates to sample or locate pixel values in the template image along one or more rotationally invariant paths, e.g., the circular perimeter of one or more circles. This essentially operates to sample the image in a manner which is rotationally invariant, i.e., locate pixels in the template image along one or more circular perimeters or circular paths.

In step 524, the method performs the first-pass color match search using the color information obtained in step 520, similarly as described above.

In step 526 the method performs pattern matching through the various target image regions surrounding the color match candidate regions determined in step 524, using the circular perimeter sample pixels and the target image. The pattern matching may be performed for each of the one or more circles located in the template image. This rotation invariant pattern matching preferably uses a cyclic correlation. The cyclic correlation method first correlates the two signals, i.e., the sample pixels taken from the circular path and the respective pixels in the target image, to determine a correlation value. After this first correlation, the method shifts one signal, e.g., the sample pixels, with respect to the other signal by one sample pixel and again performs a correlation. This process is repeated, preferably until all possible correlations have been performed, i.e., until the sample pixels have been shifted back to their original location. After each of these correlations has been performed, the method determines the location and/or rotation of maximum correlation. This provides information (good estimations) on the location and rotation of the template image in the target image.

The pattern matching performed in step 526 may also be used to search for changes in size of the template image in the target image. In other words, the pattern matching performed in step 526 may also be used to search for scaled versions (larger or smaller) of the template image. This is accomplished by scaling (increasing or decreasing) the size of the search circles. More particularly, for scale invariant matching, the method uses sample pixels from a respective circular perimeter from the template, e.g., of radius R. During the pattern matching, the method changes the radius of the search circle. The method increases the radius R when searching for patterns that are bigger than the template image and decreases the radius R when searching for patterns in the image that are smaller than the template image.

Figure 20:
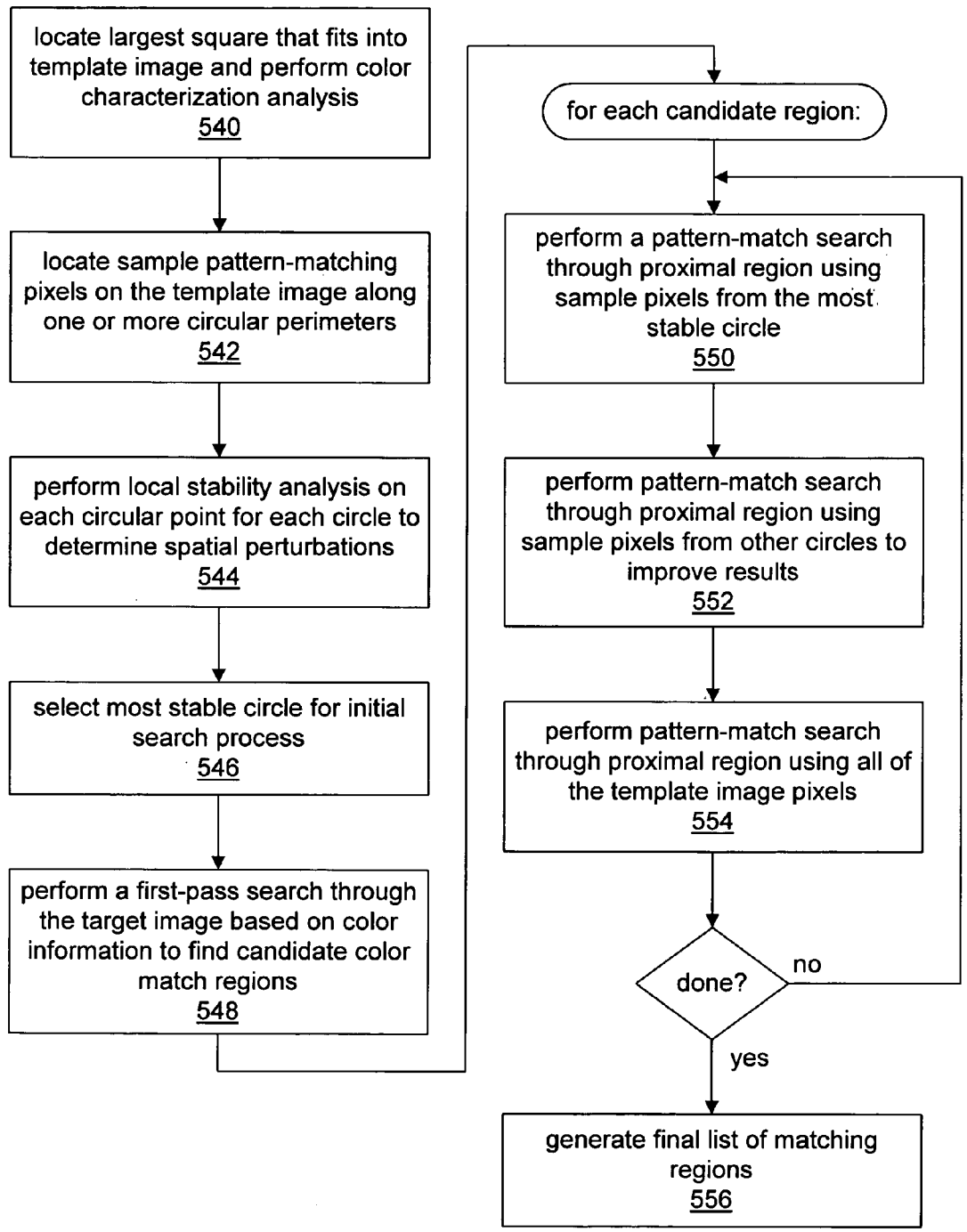
FIG. 20 is a flowchart diagram illustrating one embodiment of a method for performing rotation invariant color and pattern matching using a coarse to fine search procedure.

FIG. 20—Rotation Invariant Color and Pattern Matching Using a Coarse to Fine Search FIG. 20 is a flowchart diagram illustrating one embodiment of a method for performing rotation invariant color and pattern matching using a coarse to fine search procedure.

In step 540, the color information of the largest square that fits in the template image is analyzed, similarly as described above for step 520 of FIG. 19.

In step 542 the method operates to locate pixel values in the template image along one or more rotationally invariant paths, e.g., along a circular perimeter of one or more circles. This essentially operates to sample the template image in a manner which is rotationally invariant, i.e., locate sample pixels in the template image along one or more circular perimeters or circular paths.

In step 544 the method optionally performs a local stability analysis on the sample pixel values from each circular path to determine respective stability with respect to spatial perturbations. For each sample pixel, the local stability analysis comprises finding a neighborhood around the sample pixel where the value of the sample pixel correlates highly with the template image pixel values in the neighborhood. In step 544 the method determines the stability region or neighborhood size for the sample pixels of each of the respective circles. The method also preferably computes a step size for each of the circles. The local stability analysis thus determines a plurality of sets of sample pixels with differing stability neighborhood sizes.

In step 546 the method selects the sample pixels of the most stable circle for the initial pattern match search. Alternatively, the method selects an ordering of sample pixels from at least a subset of the circles, preferably from most stable to least stable, for use in the coarse to fine search.

In step 548, the method performs a first-pass color match search to identify zero or more candidate color match regions, similarly as described above.

Steps 550–556 may then be performed for a proximal region surrounding each color match region identified in step 548.

In step 550 the method performs pattern matching using the sample pixels from one or more of the most stable circles. The method preferably compares the sample pixels with a plurality of portions of the target image region, optionally using the computed step size to step the sample pixels across the target image region. The pattern matching performed in step 550 preferably determines zero or more candidate regions where a rotated version of the template image may be located. This pattern matching also preferably determines a rotation value indicating the possible rotation of the template image in the target image based on the maximum correlation value obtained in the cyclic correlation.

In step 552 the method performs pattern matching using sample pixels from one or more other circles to improve results. In the preferred embodiment, the method performs a coarse to fine search, wherein in step 550 the method determines one or more candidate regions and corresponding rotation values where the template image may be located. In step 552 the method performs pattern matching using sample pixels from one or more other less stable circles at sub-regions surrounding these candidate regions and preferably using these rotation values. Thus, the method performs a coarse to fine search process as described above, wherein sample pixel values for the most stable circular path are first used in an initial search process, and then sample pixel values from additional circles are used at possible match locations to improve the initial search results and accurately determine the template's position and rotation in the image.

Figure 21A:
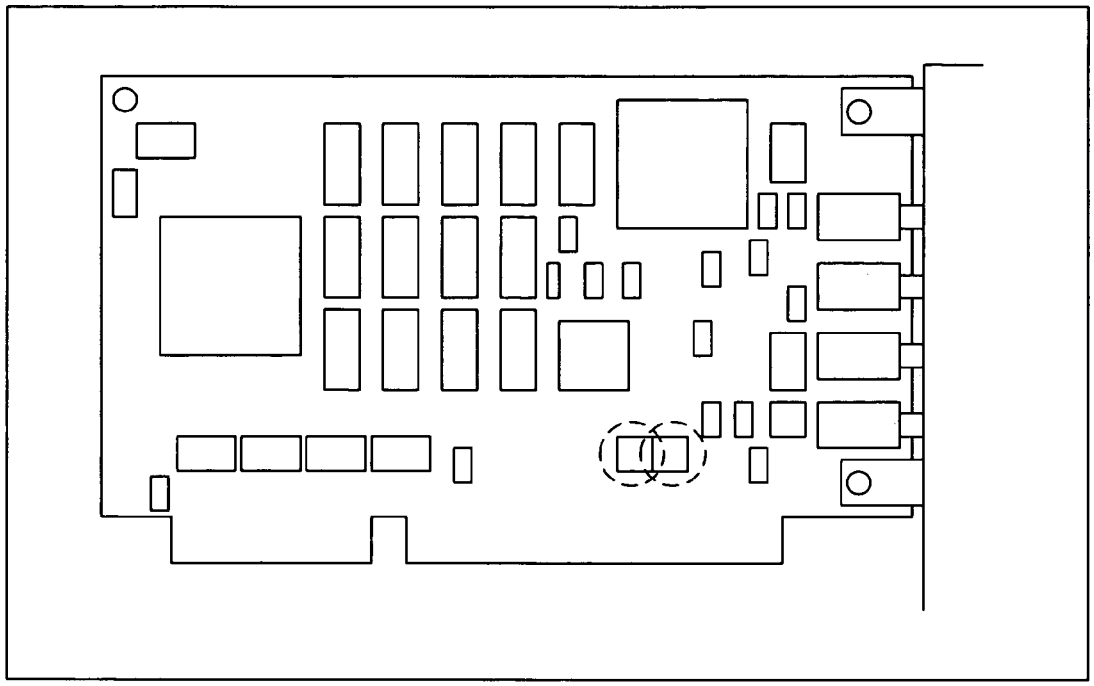
FIGS. 21A, 21B, and 22 illustrate an application of a rotation invariant pattern matching method.
Figure 21B:
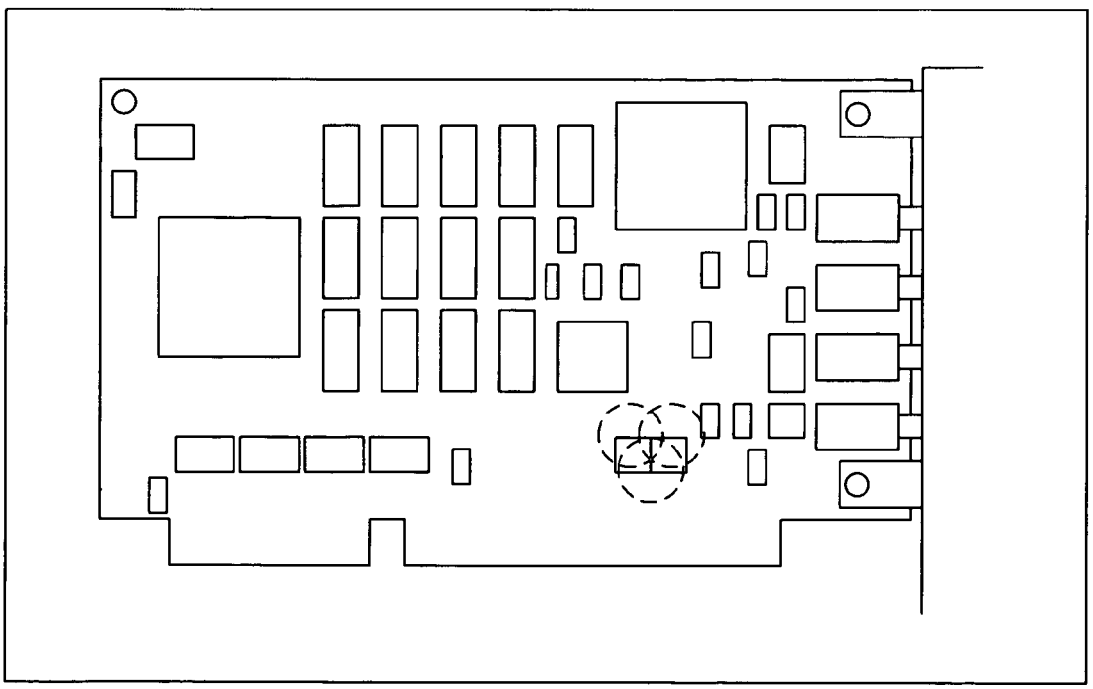
Figure 22:
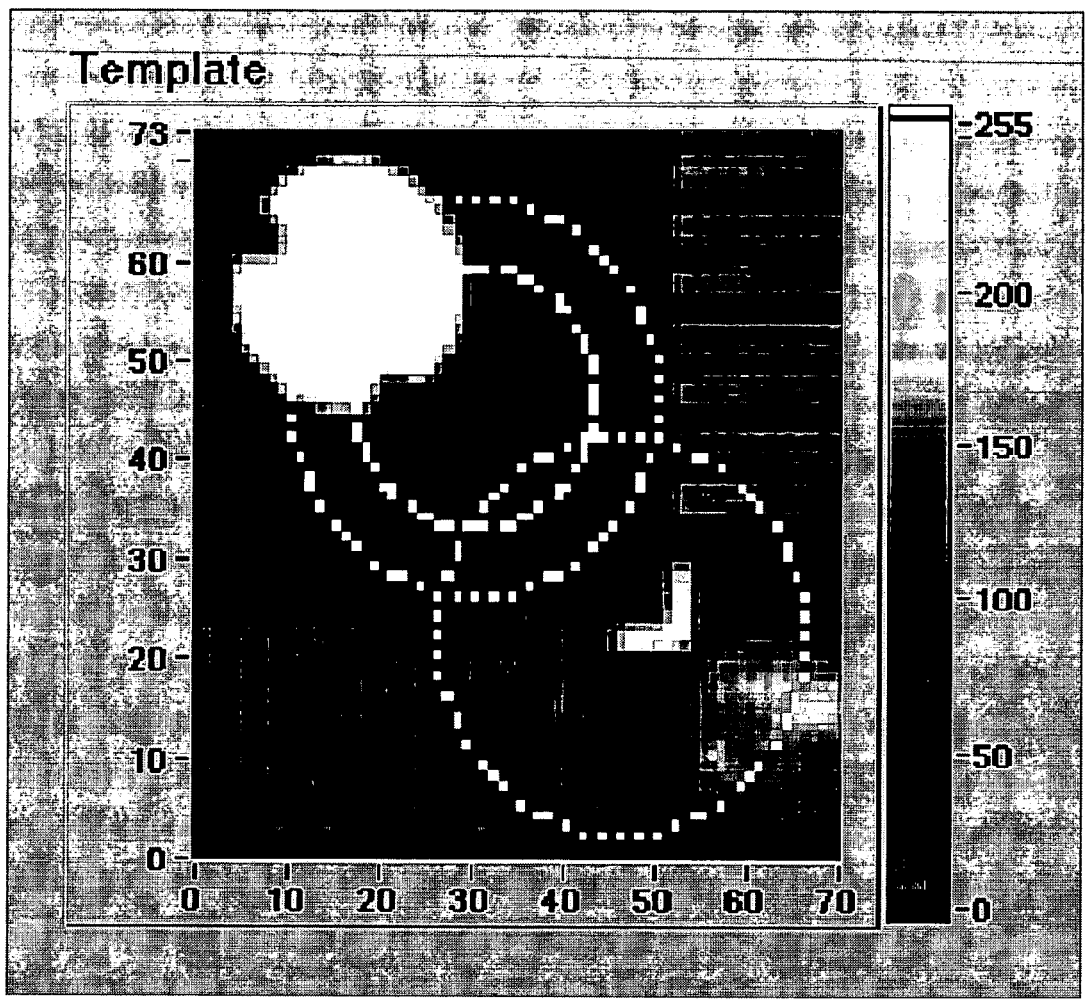

In the preferred embodiment, the rotation invariant pattern matching method utilizes non-overlapping circular paths in the image. Also, in the preferred embodiment the method uses multiple circles to reject false matches. The method also may use concentric circles, as desired. FIGS. 21A and 21B illustrate the characterization of the template image (a printed circuit board) for rotation invariant matching using sample pixels taken from one or more circular paths. FIG. 21A shows the use of sample pixels from concentric circles, and FIG. 21B shows the use of non-concentric, non-overlapping circles. FIGS. 21A and 21B also show an example template image which is desired to be found in the target image. FIG. 22 is an actual screen shot illustrating the use of concentric and non-concentric circles.

In step 554 the method optionally performs a pattern matching using all of the template image pixels, preferably using a rotation value determined in either of steps 550 or 552 to rotate the template image pixels prior to the pattern matching. In other words, the template image is rotated to approximately match the orientation of the candidate region in the target image, and then the pattern matching is performed using all of the template image pixels. This rotation of the template image prior to the pattern matching is necessary since the entire template image is not rotationally invariant.

After the pattern matching performed in steps 550, 552 and/or 554, the method then generates the results in step 556, similarly as described above. In this case, the results may include the location of zero or more template image instances in the target image, as well as the rotation or orientation of each instance.

Scaled Versions of the Template Image

The methods described in FIGS. 19 and 20 may also be used to search for changes in size of the template image in the target image. In other words, the pattern matching may also be used to search for scaled versions (larger or smaller) of the template image. This is accomplished by scaling (increasing or decreasing) the size of the search circles. More particularly, for scale invariant matching, the method uses sample pixels from a respective circular perimeter from the template, e.g., of radius R. During the pattern matching, the method changes the radius of the search circle. The method increases the radius R when searching for patterns that are bigger than the template image and decreases the radius R when searching for patterns in the image that are smaller than the template image.

Figure 23:
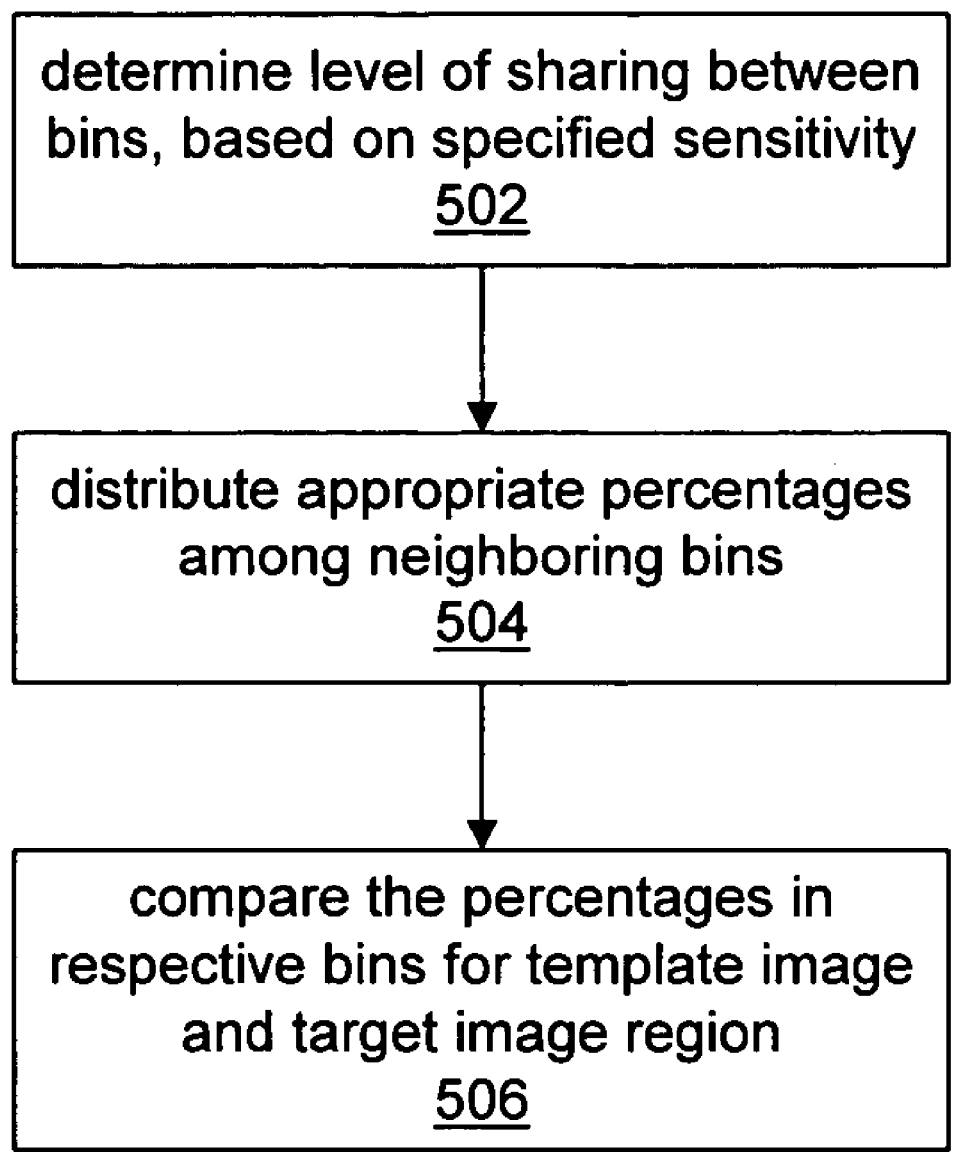
FIG. 23 is a flowchart diagram illustrating one embodiment of a method for performing pixel sharing or redistribution during a color characterization analysis of an image.
Figure 24:
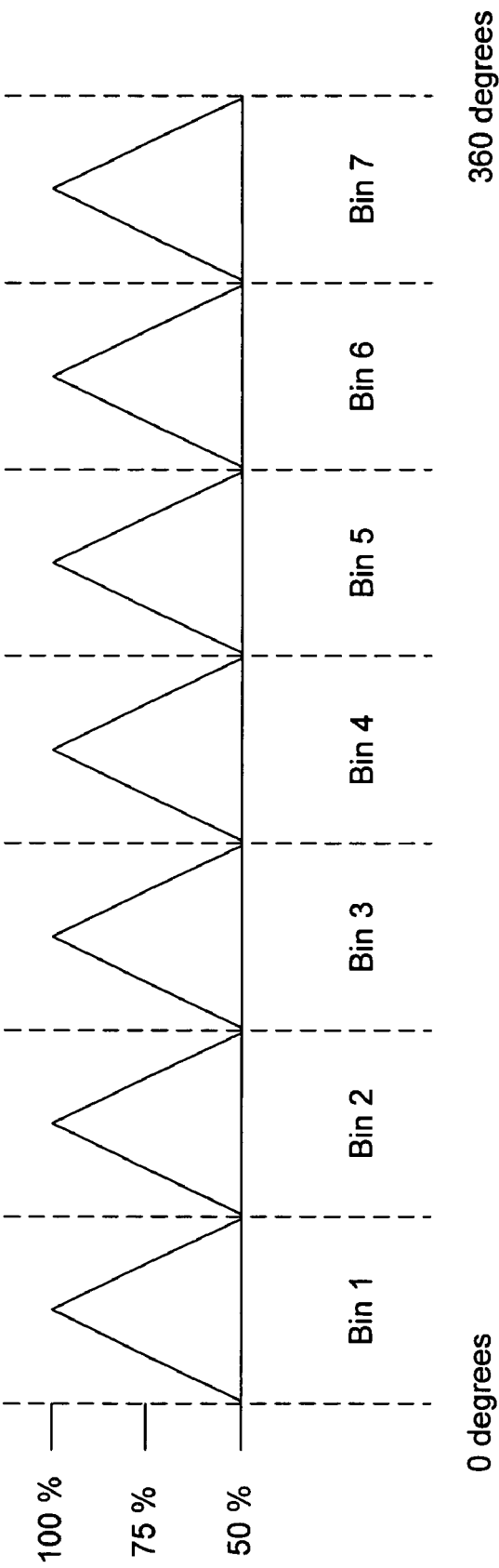
FIGS. 24 and 25 illustrate the use of fuzzy membership functions to distribute pixels into color bins fractionally.
Figure 25:
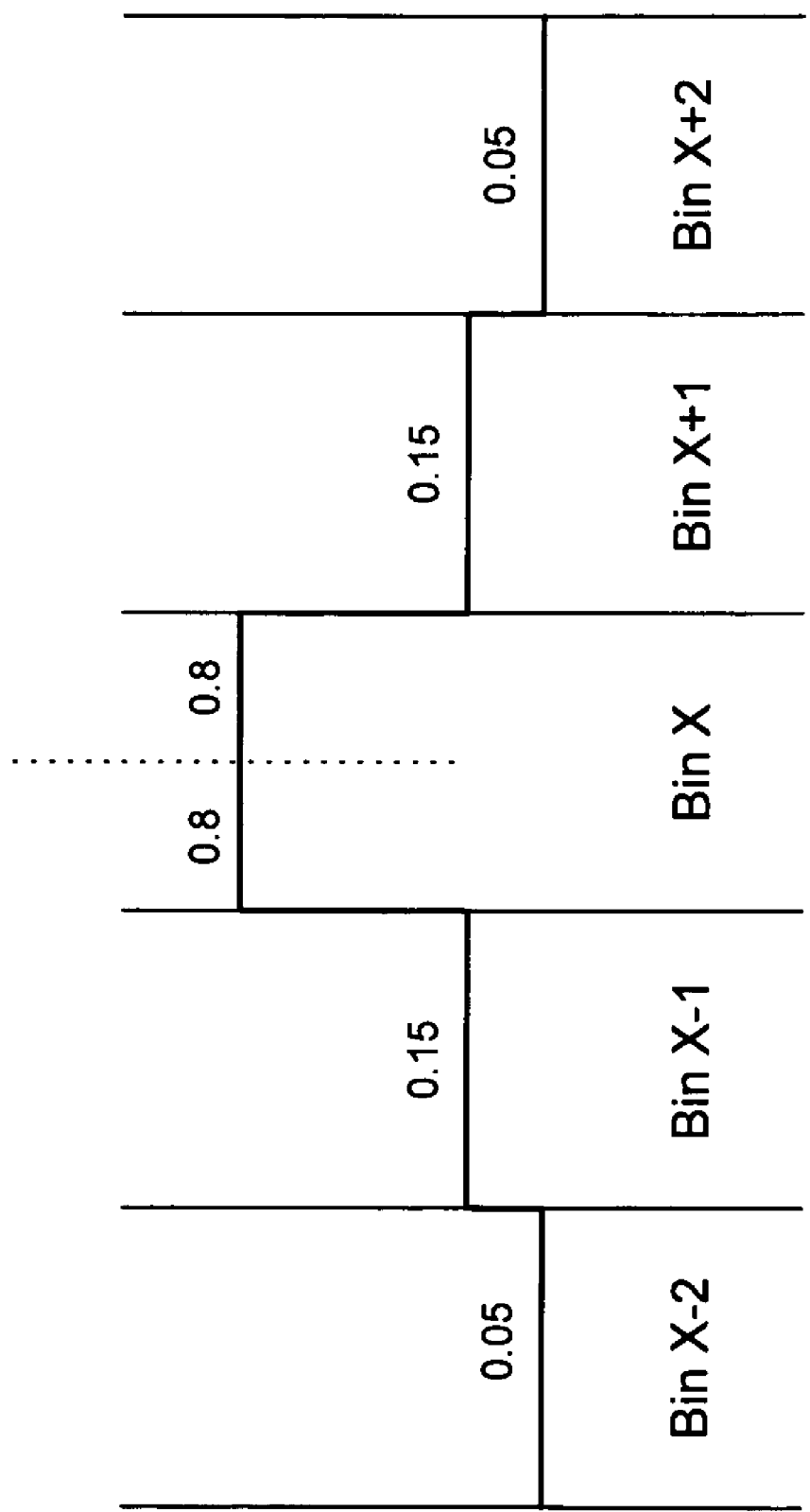

FIGS. 23–25: Alternative Color Bin Distribution Techniques

As discussed above with reference to FIG. 16, it may sometimes be desirable to modify the way in which pixels are assigned to color bins, e.g., to account for an image that has colors that are very similar to each other. Thus, in various embodiments, a portion of the percentages of pixels assigned to each bin may be manipulated, in order to share pixels among or re-distribute pixels to neighboring bins, before calculating the measure of color spectrum difference as described above.

FIG. 23 is a flowchart diagram illustrating one embodiment of a method for performing this type of pixel sharing or re-distribution. As shown, in step 502 the level of sharing or distribution may be determined according to a color sensitivity level specified by the user. In one embodiment, each bin shares with zero bins, one neighboring bin on each side, or two neighboring bins on each side, depending on a specified sensitivity level of low, medium, or high, respectively. In another embodiment, the level of sharing or distribution with neighboring bins may be determined automatically by the computer, e.g., if a certain threshold of pixels of the template image and the target image region fall into respective neighboring bins (as in the example given above with reference to FIG. 16), then the method may automatically apply a level of sharing or distribution. Thus, the method may automatically detect and compensate for the types of errors described above.

In step 504, the pixel allocation percentages may be re-distributed among neighboring bins. Step 504 may be performed in any of various ways. For example, in one embodiment, a respective bin that contains 40% of all pixels may share 10% of its total with the neighboring bins on either side. In other words, 4% (10% of 40%) may be added to the neighboring bins on either side of the respective bin. This would leave 32% in the respective bin (40%−4%−4%=32%). The neighboring bins may then undergo the same sharing process, and a certain percent may be shifted back as well as a certain percent being shifted to another neighboring bin, and so on. Any of various other methods may be used in re-distributing the pixel percentages. These types of adjustments may have an effect similar to adding additional bins, making the results smoother. Hence, these types of adjustments may be referred to as "smoothing operations". A smoothing operation may be performed for both the template image and the target image region.

In step 506 the compensated percentages of the template image and target image region may then be compared. For example, step 506 may involve subtracting percentages in respective bins of the template image and target image region and summing the results, similarly as described above. This may produce a value representing a measure of difference between the color information of the template image and the color information of the target image region.

It may sometimes be desirable to distribute pixels among multiple bins, based not only on bin percentages, but also on where the pixels fall in the bins, in terms of the portions of color space represented by the bins. For example, as described above with reference to FIG. 9, pixels may be assigned to multiple bins at the time when the color characterization analysis is performed, e.g., on a fractional weighted basis. Although the increased complexity may decrease the efficiency of the color characterization analysis, in certain cases more accurate color match location results may be achieved.

Various embodiments may employ fuzzy membership functions to determine the desired distribution among multiple bins. FIGS. 24 and 25 illustrate two examples of how such functions may be utilized. In FIG. 24, the 360-degree hue plane is divided into seven bins, which are shown linearly. For each pixel, the bin that the pixel falls into may be determined, as well as the position within this bin. A function may then be applied, based on the position within the bin, in order to determine a percentage of the pixel weight which should be assigned to that bin. The remaining portion of the pixel weight may be assigned to the neighboring bin on the respective side. This is represented by the angular lines drawn over each bin. In this example, if a pixel falls exactly within the center of a bin, then, as shown, 100% of the pixel weight is assigned to that bin. If a pixel falls one fourth away from the edge of the bin, then 75% of the pixel weight is assigned to that bin, and 25% of the pixel weight is assigned to the neighboring bin next to that edge.

FIG. 25 illustrates another example of distributing a pixel among multiple bins. In the example of FIG. 25, a step function as applied. Consider the bin labeled "Bin X." If the pixel falls to the left of the center line shown, i.e., in terms of the pixel's hue, then Bin X is assigned 80% of the pixel weight, Bin X-1 is assigned 15% of the weight, and Bin X-2 is assigned 5% of the pixel weight. Thus, in this example, each pixel is distributed across three bins. Increasing the number of bins over which a pixel is distributed may be especially desirable when the hue space is partitioned into a large number of bins. It is noted that the distribution functions shown in FIGS. 24 and 25 are exemplary, and any other technique may be used in determining an appropriate pixel distribution.

FIG. 26—Color Match Location User Interface

FIG. 26 illustrates an example of a graphical user interface (GUI) associated with color and pattern match location software according to one embodiment of the present invention. A brief description of applicable GUI elements is given below. It is noted that various other embodiments of such a GUI may comprise GUI elements enabling the user to specify variables affecting the color and pattern match location operation at a broader or finer level of granularity than the GUI shown in FIG. 26.

"Image Type" displays the color format of the current target image. Color formats may include RGB, CMY, or HSI, among others.

"Learn Mode" specifies the invariant features to learn when setting up a learn color pattern. The following values may be selected: "All" (extracts template information for shift and rotation invariant matching"; "Shift Information" (Default) (extracts information for shift invariant matching); "Rotation Information" (extracts information for rotation invariant matching).

"Ignore Black and White" enables the user to specify that pixels classified as black and/or white are ignored in the match location operation.

"Feature Mode" specifies the features to use in the searching stage. The following values may be chosen: "Color" (use color features only in the searching stage); "Shape" (use shape features in the searching stage); and "Color and Shape" (Default) (use both color and shape features in the searching stage.

"Color Sensitivity" specifies a level of color sensitivity ("low", "medium", or "high"). This setting may affect the number of color category divisions to use.

"Search Strategy" specifies the different searching algorithms to achieve a tradeoff between search speed and accuracy. The default option is "Balanced". In case the speed does not meet requirements, the "Aggressive" option may be used. In case the accuracy does not meet requirements, the "Conservative" option may be used.

"Number of Matches Expected" specifies a number of matches expected to be found in the target image, which may be used in limiting the number of target image regions searched.

"Match Mode" specifies the technique to use when looking for the template pattern in the image. The following values may be chosen: "Shift Invariant" (default) (searches for the template pattern in the image, assuming that it is not rotated more than ±4°); "Rotation Invariant" (searches for the template in the image with no restriction on the rotation of the template). If the "Feature Mode" is set to "Color" only, then the rotation Invariant matching can also be achieved by using a square template image in "Shift Invariant" mode.

"Minimum match score" specifies a threshold value for color matching scores. The data range is between 0 and 1000.

As shown, the GUI also includes various fields for viewing information for each matching region of the target image, once the search has been performed, such as the location and size of the region, a match score indicating how close the color information of the region matches the color information of the template image, etc.

Figure 27:
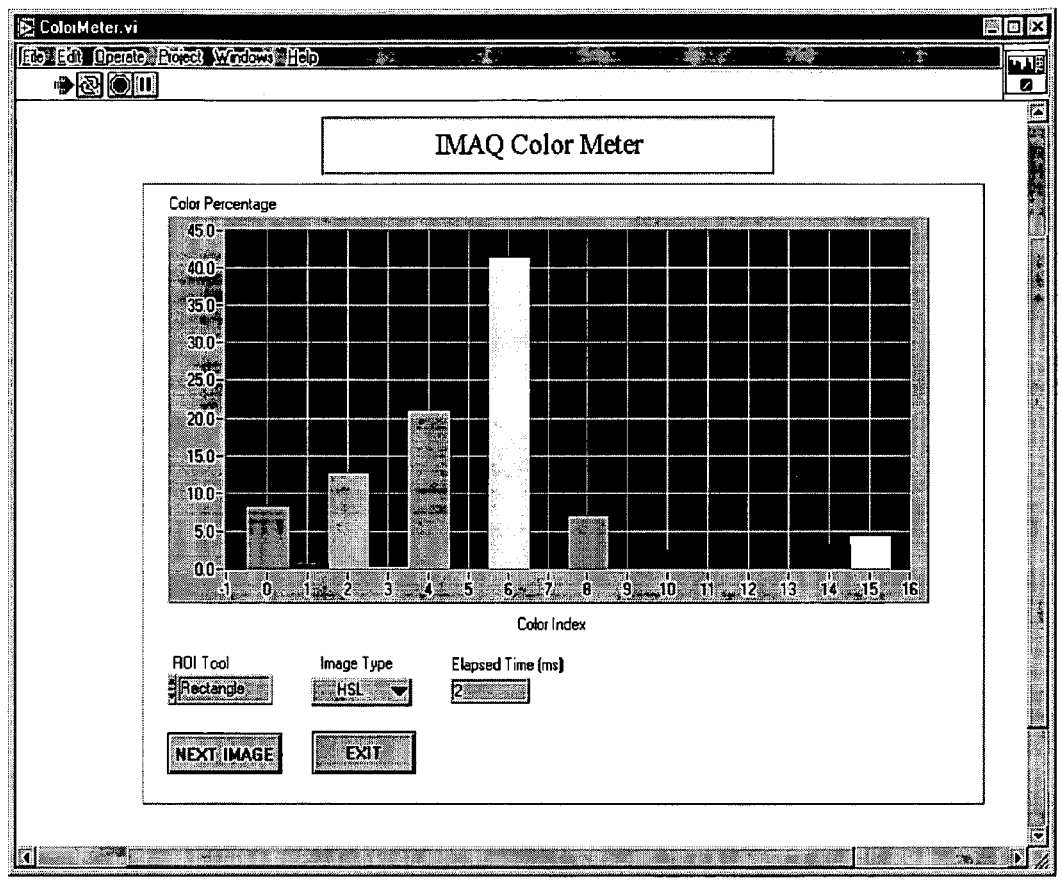
FIG. 27 illustrates an exemplary display of information representing the color characterization of an image or portion of an image.

FIG. 27—Display Color Characterization Information

In one embodiment, an application may be operable to display information representing the color characterization of an image or portion of an image. FIG. 27 illustrates one example of such a display. FIG. 27 shows the percentage (vertical scale) of 16 defined colors (horizontal scale) as determined by one embodiment of the color characterization method described herein.

The color characterization list or data structure may further be operated upon to create a color characterization represented as a single value. The color characterization may also be represented textually (e.g., by the terms brick red, jet black, mauve, etc.) through the use of a look-up table configured according to the color categorization method of the present invention. The color characterization may also be represented graphically in various ways. The color characterization may be stored along with the image or transmitted to other computer systems for analysis or display. The color characterization may also be used as part of an image compression technique.

ALTERNATE EMBODIMENT

In one embodiment, the method operates to locate regions of a target image that match a template image with respect to color and pattern information. This method may comprise performing a color matching search through the target image in order to find one or more color match regions, wherein the color match color regions match the template image with respect to color information. The method also may perform a pattern matching search through the target image in order to find one or more pattern match regions in the target image. The method may then determine one or more match regions from the one or more color match color regions and the one or more pattern match regions. For example, the method may correlate the one or more color match color regions and the one or more pattern match regions to determine regions that have both color match and pattern match characteristics according to a desired degree or metric. As described above, the color matching search and the pattern matching search may be performed in any of various desired orders.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for locating regions of a target image that match a template image with respect to color and pattern information, the method comprising:
    performing a color matching search through the target image in order to find one or more candidate color match regions, wherein the candidate color match regions match the template image with respect to color information, wherein said performing the color matching search through the target image comprises:
        determining a plurality of sample regions at which to sample color information of the target image, wherein each sample region comprises a portion of the target image;
        for each of the plurality of sample regions, determining a measure of difference between the color information of the sample region and color information of the template image;
        for each of the plurality of sample regions, designating the sample region as a candidate color match region if the measure of difference between the color information of the sample region and the color information of the template image is smaller than a threshold value;
    for each candidate color match region found in the color matching search, performing a pattern matching search of a proximal region proximal to the color match region in order to find one or more match regions in the target image;
    wherein the one or more match regions found in the pattern matching search of each proximal region match the template image with respect to color and pattern information.

2. The method of claim 1, further comprising:
    for each match region found that matches the template image with respect to color and pattern information, displaying information on a graphical user interface indicating the location of the match region within the target image.

3. The method of claim 1, further comprising:
    for each match region found that matches the template image with respect to color and pattern information, displaying information on a graphical user interface indicating a degree to which color and pattern information of the match region matches color and pattern information of the template image.

4. The method of claim 1, further comprising:
    performing a color characterization analysis of the template image; and
    for each of the plurality of sample regions, performing a color characterization analysis of the sample region;
    wherein said determining the measure of difference between the color information of each sample region and the color information of the template image comprises comparing information obtained in the color characterization analysis of the sample region with information obtained in the color characterization analysis of the template image.

5. The method of claim 4,
    wherein the template image and the target image each comprise a plurality of pixels;
    wherein the color characterization analysis performed for the template image and the color characterization analysis performed for each of the plurality of sample regions comprise:
        examining color information of at least a subset of pixels;
        assigning each examined pixel to a color category that corresponds to a portion of a color space;
        determining information indicative of the allocation of the examined pixels across color categories;
    wherein said comparing information obtained in the color characterization analysis of the sample region with information obtained in the color characterization analysis of the template image comprises comparing the allocations of the examined pixels across color categories for the sample region and the template image, respectively.

6. The method of claim 5,
    wherein the color characterization analysis performed for the template image further comprises:
        determining one or more dominant color categories, wherein the one or more dominant color categories are assigned a relatively larger proportion of examined pixels, with respect to other color categories of the color space;
    wherein said comparing information obtained in the color characterization analysis of the sample region with information obtained in the color characterization analysis of the template image further comprises comparing the dominant color categories of the sample region and the template image, respectively.

7. The method of claim 5,
    wherein the color characterization analysis performed for the template image comprises examining color information of each pixel in the template image;
    wherein the color characterization analysis performed for each of the plurality of sample regions comprise examining color information of only a subset of the pixels in the sample region.

8. The method of claim 5,
    wherein the color information of the template image and the color information of the target image comprise hue, saturation, and intensity (HSI) color information;
    wherein said examining color information of at least a subset of pixels comprises examining HSI information of the at least a subset of pixels;
    wherein said assigning each examined pixel to a color category that corresponds to a portion of a color space comprises assigning each examined pixel to a color category that corresponds to a portion of HSI color space.

9. The method of claim 5, further comprising:
    receiving user input specifying a desired color sensitivity level to use in said performing the color matching search;
    wherein the user input determines a number of categories into which the color space is divided.

10. The method of claim 5, wherein the color characterization analysis performed for each of the plurality of sample regions of the target image further comprises:
- performing a smoothing operation after said assigning each examined pixel to a color category;

wherein the smoothing operation comprises:
- for each respective color category of at least a subset of the possible color categories, re-distributing a portion of the pixels assigned to the respective color category to one or more neighboring color categories.

11. The method of claim 5,
wherein said assigning each examined pixel to a color category is performed in accordance with a fuzzy membership function.

12. The method of claim 1, wherein the target image comprises a plurality of pixels, the method further comprising:
- determining a first step size to use in said determining the plurality of sample regions at which to sample the color information of the target image;
- wherein said determining the plurality of sample regions comprises:
  - determining a plurality of regions of the target image at which to sample the color information of the target image, wherein the plurality of regions are each specified by windows into the target image, wherein windows are offset from each other by a number of pixels specified by the first step size.

13. The method of claim 1, further comprising:
receiving the target image;
wherein the target image is received from one of the group consisting of:
- a memory medium, a hardware device, and a software application.

14. The method of claim 1, wherein the template image and the target image each comprise a plurality of pixels, the method further comprising:
- characterizing pattern information of the template image, wherein the characterizing comprises:
  - sampling the template image to determine a first plurality of sample pixels, wherein the first plurality of sample pixels comprises a subset, but not all, of the pixels of the template image;
- wherein said performing a pattern matching search of a proximal region proximal to each candidate color match region uses the first plurality of sample pixels.

15. The method of claim 1, wherein the characterizing further comprises:
- characterizing pattern information of the template image, wherein said characterizing the pattern information comprises:
  - sampling the template image to determine a first plurality of sample pixels, wherein the first plurality of sample pixels comprises a subset, but not all, of the pixels of the template image; and
  - performing a local stability analysis around at least a subset of the first plurality of sample pixels, wherein said performing the local stability analysis determines a second plurality of sample pixels which have a desired degree of stability, wherein the second plurality of sample pixels comprises a subset, but not all, of the first plurality of sample pixels;
- wherein said performing a pattern matching search of a proximal region proximal to each candidate color match region uses the second plurality of sample pixels.

16. The method of claim 15,
wherein said performing the local stability analysis operates to ensure stability of each of the second plurality of sample pixels to spatial perturbations around the sample pixel.

17. The method of claim 15,
wherein said performing the local stability analysis around the at least a subset of the first plurality of sample pixels comprises:
- for each sample pixel, finding a neighborhood around the sample pixel where a value of the sample pixel correlates highly with template image pixel values in the neighborhood.

18. The method of claim 15,
wherein said performing the local stability analysis determines a plurality of sets of sample pixels with differing stability neighborhood sizes; and
wherein said performing a pattern matching search of a proximal region proximal to each candidate color match region comprises performing a plurality of iterations of pattern matching using different ones of the sets of sample pixels.

19. The method of claim 18,
wherein said performing the plurality of iterations of pattern matching uses different step sizes for each of the different ones of the sets of sample pixels.

20. The method of claim 15,
wherein said performing the local stability analysis determines a plurality of sets of sample pixels with differing stability neighborhood sizes;
wherein said performing a pattern matching search of a proximal region proximal to each candidate color match region comprises performing a plurality of iterations of pattern matching using different ones of the sets of sample pixels in a coarse to fine manner.

21. The method of claim 20,
wherein said performing the plurality of iterations of pattern matching in the coarse to fine manner uses one or more of:
sets of sample pixels with successively smaller stability neighborhood sizes; and
sets of sample pixels with successively smaller step sizes.

22. The method of claim 15,
wherein each of the pixels in the template image are comprised of a plurality of components; and
wherein said sampling the template image comprises sampling the template image in one or more component planes of the plurality of components.

23. The method of claim 22,
wherein each of the pixels in the template image are comprised of hue, saturation, and intensity components; and
wherein said sampling the template image comprises sampling the template image in one or more of the hue, saturation, and intensity planes.

24. The method of claim 1, wherein each of the proximal regions surrounds its respective color match region.

25. A system for locating regions of a target image that match a template image with respect to color and pattern information, the system comprising:
a processor;
a memory medium coupled to the processor, wherein the memory medium stores color/pattern matching software;
wherein the processor is operable to execute the color/pattern matching software to:

perform a color matching search through the target image in order to find one or more candidate color match regions, wherein the candidate color match regions match the template image with respect to color information, wherein, in performing the color matching search through the target image, the processor is operable to:

determine a plurality of sample regions at which to sample color information of the target image, wherein each sample region comprises a portion of the target image;

for each of the plurality of sample regions, determine a measure of difference between the color information of the sample region and color information of the template image;

for each of the plurality of sample regions, designate the sample region as a candidate color match region if the measure of difference between the color information of the sample region and the color information of the template image is smaller than a threshold value;

for each candidate color match region found in the color matching search, perform a pattern matching search of a proximal region proximal to the candidate color match region in order to find one or more match regions in the target image;

wherein the one or more match regions found in the pattern matching search of each proximal region match the template image with respect to color and pattern information.

26. The system of claim 25,
wherein the system further includes a display;
wherein, for each match region found that matches the template image with respect to color and pattern information, the display is operable to display information on a graphical user interface indicating the location of the match region within the target image.

27. The system of claim 25,
wherein the system further includes a display;
wherein, for each match region found that matches the template image with respect to color and pattern information, the display is operable display information on a graphical user interface indicating a degree to which color and pattern information of the region matches color and pattern information of the template image.

28. The system of claim 25, wherein the processor is further operable to:
perform a color characterization analysis of the template image;
for each of the plurality of sample regions, perform a color characterization analysis of the sample region;
wherein, in determining the measure of difference between the color information of each sample region and the color information of the template image, the processor is operable to compare information obtained in the color characterization analysis of the sample region with information obtained in the color characterization analysis of the template image.

29. The system of claim 28,
wherein the template image and the target image each comprise a plurality of pixels;
wherein, in performing the color characterization analysis for the template image and the color characterization analysis for each of the plurality of sample regions, the processor is operable to:
  examine color information of at least a subset of pixels;
  assign each examined pixel to a color category that corresponds to a portion of a color space; and
  determine information indicative of the allocation of the examined pixels across color categories;
wherein, in comparing information obtained in the color characterization analysis of the sample region with information obtained in the color characterization analysis of the template image, the processor is operable to compare the allocations of the examined pixels across color categories for the sample region and the template image, respectively.

30. The system of claim 29,
wherein, in performing the color characterization analysis for the template image, the processor is operable to:
  determine one or more dominant color categories, wherein the one or more dominant color categories are assigned a relatively larger proportion of examined pixels, with respect to other color categories of the color space;
wherein, in comparing information obtained in the color characterization analysis of the sample region with information obtained in the color characterization analysis of the template image, the processor is operable to compare the dominant color categories of the sample region and the template image, respectively.

31. The system of claim 29,
wherein, in performing the color characterization analysis for the template image, the processor is operable to examine color information of each pixel in the template image;
wherein, in performing the color characterization analysis for each of the plurality of sample regions, the processor is operable to examine color information of only a subset of the pixels in the sample region.

32. The system of claim 29,
wherein the processor is operable to assign each examined pixel to a color category in accordance with a fuzzy membership function.

33. The system of claim 25, wherein the template image and the target image each comprise a plurality of pixels;
wherein the processor is further operable to characterize pattern information of the template image, wherein, in characterizing the pattern information, the processor is operable to:
  sample the template image to determine a first plurality of sample pixels, wherein the first plurality of sample pixels comprises a subset, but not all, of the pixels of the template image;
wherein, in performing a pattern matching search of a proximal region proximal to each candidate color match region, the processor is operable to execute the color/pattern matching software to:
  perform a pattern matching search of a proximal region proximal to each candidate color match region using the first plurality of sample pixels.

34. The system of claim 25,
wherein the template image and the target image each comprise a plurality of pixels;
wherein the processor is further operable to characterize pattern information of the template image, wherein, in characterizing the pattern information, the processor is further operable to:
  sample the template image to determine a first plurality of sample pixels, wherein the first plurality of sample pixels comprises a subset, but not all, of the pixels of the template image; and perform a local stability analysis around at least a subset of the first plurality of sample pixels, wherein said performing the local stability analysis determines a second plurality of sample pixels which have a desired degree of stability, wherein the second plurality of sample pixels comprises a subset, but not all, of the first plurality of sample pixels;

wherein, in performing a pattern matching search of a proximal region proximal to each candidate color match region, the processor is operable to execute the color/pattern matching software to:

perform a pattern matching search of a proximal region proximal to each candidate color match region using the second plurality of sample pixels.

35. The system of claim 25, wherein each of the pixels in the template image are comprised of a plurality of components; and wherein the processor is operable to sample the template image in one or more component planes of the plurality of components.

36. A memory medium comprising program instructions for locating regions of a target image that match a template image with respect to color and pattern information, wherein the program instructions are executable to implement:

performing a color matching search through the target image in order to find one or more candidate color match regions, wherein the candidate color match regions match the template image with respect to color information, wherein said performing the color matching search through the target image comprises:

determining a plurality of sample regions at which to sample color information of the target image, wherein each sample region comprises a portion of the target image;

for each of the plurality of sample regions, determining a measure of difference between the color information of the sample region and color information of the template image; and for each of the plurality of sample regions, designating the sample region as a candidate color match region if the measure of difference between the color information of the sample region and the color information of the template image is smaller than a threshold value;

for each candidate color match region found in the color matching search, performing a pattern matching search of a proximal region proximal to the color match region in order to find one or more match regions in the target image;

wherein the one or more match regions found in the pattern matching search of each proximal region match the template image with respect to color and pattern information.

37. The memory medium of claim 36, wherein the program instructions are further executable to implement:

for each match region found that matches the template image with respect to color and pattern information, displaying information on a graphical user interface indicating the location of the match region within the target image.

38. The memory medium of claim 36, wherein the program instructions are further executable to implement:

for each match region found that matches the template image with respect to color and pattern information, displaying information on a graphical user interface indicating a degree to which color and pattern information of the match region matches color and pattern information of the template image.

39. The memory medium of claim 36, wherein the program instructions are further executable to implement:

performing a color characterization analysis of the template image;

for each of the plurality of sample regions, performing a color characterization analysis of the sample region;

wherein said determining the measure of difference between the color information of each sample region and the color information of the template image comprises comparing information obtained in the color characterization analysis of the sample region with information obtained in the color characterization analysis of the template image.

40. The memory medium of claim 39, wherein the template image and the target image each comprise a plurality of pixels;

wherein the color characterization analysis performed for the template image and the color characterization analysis performed for each of the plurality of sample regions comprise:

examining color information of at least a subset of pixels;

assigning each examined pixel to a color category that corresponds to a portion of a color space;

determining information indicative of the allocation of the examined pixels across color categories;

wherein said comparing information obtained in the color characterization analysis of the sample region with information obtained in the color characterization analysis of the template image comprises comparing the allocations of the examined pixels across color categories for the sample region and the template image, respectively.

41. A computer-implemented method for locating at least one region of a target image that matches a template image with respect to color and pattern information, wherein the at least one region of the target image comprises an instance of a rotated template image in the target image, the method comprising:

performing a color matching search through the target image in order to find one or more candidate color match regions, wherein the candidate color match regions match the template image with respect to color information;

for each candidate color match region found in the color matching search, performing a pattern matching search of a proximal region proximal to the color match region in order to find one or more match regions in the target image;

wherein said performing the pattern matching search comprises:

sampling the template image along one or more rotationally invariant paths to produce one or more sets of sample pixels;

performing pattern matching using each of the one or more sets of sample pixels and the target image to determine one or more locations of the template image in the target image, wherein said pattern matching detects rotated versions of the template image in the target image;

wherein the one or more match regions found in the pattern matching search of each proximal region match the template image with respect to color and pattern information.

42. The method of claim 41, wherein said rotationally invariant paths comprise circular paths.

43. A computer-implemented method for locating regions of a target image that match a template image with respect to color and pattern information, wherein the template image and the target image each comprise a plurality of pixels, the method comprising:

characterizing pattern information of the template image, wherein said characterizing the pattern information comprises:

sampling the template image to determine a first plurality of sample pixels, wherein the first plurality of sample pixels comprises a subset, but not all, of the pixels of the template image;

performing a local stability analysis around at least a subset of the first plurality of sample pixels, wherein said performing the local stability analysis determines a second plurality of sample pixels which have a desired degree of stability, wherein the second plurality of sample pixels comprises a subset, but not all, of the first plurality of sample pixels;

wherein the method further comprises:

performing a color matching search through the target image in order to find one or more candidate color match regions, wherein the candidate color match regions match the template image with respect to color information; and for each candidate color match region found in the color matching search, performing a pattern matching search of a proximal region proximal to the candidate color match region in order to find one or more match regions in the target image, wherein the pattern matching search of each proximal region uses the second plurality of sample pixels;

wherein the one or more match regions found in the pattern matching search of each proximal region match the template image with respect to color and pattern information.

44. The method of claim 1, wherein each of the proximal regions comprises and is greater than its respective color match region.

45. A system for locating regions of a target image that match a template image with respect to color and pattern information, wherein the template image and the target image each comprise a plurality of pixels, the system comprising:

a processor;

a memory medium coupled to the processor, wherein the memory medium stores color/pattern matching software;

wherein the color/pattern matching software is executable by the processor to characterize pattern information of the template image, wherein said characterizing the pattern information of the template image comprises:

sampling the template image to determine a first plurality of sample pixels, wherein the first plurality of sample pixels comprises a subset, but not all, of the pixels of the template image; and performing a local stability analysis around at least a subset of the first plurality of sample pixels, wherein said performing the local stability analysis determines a second plurality of sample pixels which have a desired degree of stability, wherein the second plurality of sample pixels comprises a subset, but not all, of the first plurality of sample pixels;

wherein the color/pattern matching software is further executable by the processor to:

perform a color matching search through the target image in order to find one or more candidate color match regions, wherein the candidate match regions match the template image with respect to color information; and for each candidate color match region found in the color matching search, perform a pattern matching search of a proximal region proximal to the candidate color match region in order to find one or more match regions in the target image, wherein the pattern matching search of each proximal region uses the second plurality of sample pixels;

wherein the one or more match regions found in the pattern matching search of each proximal region match the template image with respect to color and pattern information.

46. The system of claim 45, wherein each of the proximal regions comprises and is greater than its respective color match region.

47. A memory medium comprising program instructions for locating regions of a target image that match a template image with respect to color and pattern information, wherein the program instructions are executable to implement:

characterizing pattern information of the template image, wherein said characterizing the pattern information comprises:

sampling the template image to determine a first plurality of sample pixels, wherein the first plurality of sample pixels comprises a subset, but not all, of the pixels of the template image;

performing a local stability analysis around at least a subset of the first plurality of sample pixels, wherein said performing the local stability analysis determines a second plurality of sample pixels which have a desired degree of stability, wherein the second plurality of sample pixels comprises a subset, but not all, of the first plurality of sample pixels;

wherein the program instructions are further executable to implement:

performing a color matching search through the target image in order to find one or more candidate color match regions, wherein the candidate color match regions match the template image with respect to color information; and for each candidate color match region found in the color matching search, performing a pattern matching search of a proximal region proximal to the candidate color match region in order to find one or more match regions in the target image, wherein the pattern matching search of each proximal region uses the second plurality of sample pixels;

wherein the one or more match regions found in the pattern matching search of each proximal region match the template image with respect to color and pattern information.

48. The memory medium of claim 47, wherein each of the proximal regions comprises and is greater than its respective color match region.

49. The method of claim 1, wherein each of the proximal regions comprises and is greater than its respective color match region.

50. The system of claim 25, wherein each of the proximal regions comprises and is greater than its respective color match region.

51. The memory medium of claim 36, wherein each of the proximal regions comprises and is greater than its respective color match region.

* * * * *

UNITED STATES PATENT AND TRADEMARK OFFICE
CERTIFICATE OF CORRECTION

| | | |
|---|---|---|
| PATENT NO. | : 6,963,425 B1 | |
| APPLICATION NO. | : 09/638271 | |
| DATED | : November 8, 2005 | |
| INVENTOR(S) | : Dinesh Nair et al. | |

It is certified that error appears in the above-identified patent and that said Letters Patent is hereby corrected as shown below:

Column 43, Line 39, please delete "The method of claim 1," and substitute
-- The method of claim 43, --.

Signed and Sealed this
Eighteenth Day of October, 2011

David J. Kappos
*Director of the United States Patent and Trademark Office*